United States Patent [19]

Leiber

[11] Patent Number: 4,875,338

[45] Date of Patent: Oct. 24, 1989

[54] HYDRAULIC BRAKE BOOSTER ARRANGEMENT WITH PARALLEL MASTER CYLINDERS AND COMMON HOUSING FOR PIVOTABLE ROCKER

[75] Inventor: Heinz Leiber, Oberriexingen, Fed. Rep. of Germany

[73] Assignee: Daimler-Benz Aktiengesellschaft, Stuttgart, Fed. Rep. of Germany

[21] Appl. No.: 139,385

[22] Filed: Dec. 30, 1987

[30] Foreign Application Priority Data

Jan. 13, 1987 [DE] Fed. Rep. of Germany ....... 3700697

[51] Int. Cl.$^4$ .................. B60T 13/12; B60T 15/02
[52] U.S. Cl. ............................. 60/550; 60/553; 60/581; 303/114
[58] Field of Search .............. 60/547.1, 550, 551, 60/552, 553, 562, 580, 581, 588; 91/368, 370, 372, 373

[56] References Cited

U.S. PATENT DOCUMENTS

| | | | |
|---|---|---|---|
| 3,910,643 | 10/1975 | Kobashi et al. | 60/580 X |
| 3,927,915 | 12/1975 | Adachi | 303/52 X |
| 4,015,881 | 4/1977 | Adachi | 60/581 X |
| 4,135,435 | 1/1979 | Adachi | 91/372 X |
| 4,179,980 | 12/1979 | Kito et al. | 60/553 X |
| 4,433,543 | 2/1984 | Thomas et al. | 60/547.1 |
| 4,604,870 | 8/1986 | Bach et al. | 60/581 X |
| 4,624,108 | 11/1986 | Leiber | 60/581 X |
| 4,631,924 | 12/1986 | Lowe | 60/581 X |
| 4,778,224 | 10/1988 | Leiber | 60/581 X |

FOREIGN PATENT DOCUMENTS

| | | |
|---|---|---|
| 2947657 | 7/1981 | Fed. Rep. of Germany ........ 60/581 |
| 3015729 | 10/1981 | Fed. Rep. of Germany . |
| 2453573 | 11/1983 | Fed. Rep. of Germany . |
| 3444828 | 6/1986 | Fed. Rep. of Germany . |

Primary Examiner—Robert E. Garrett
Assistant Examiner—George Kapsalas
Attorney, Agent, or Firm—Barnes & Thornburg

[57] ABSTRACT

A brake unit having a hydraulic brake booster and twin master cylinders in a common housing. The brake booster comprises a drive cylinder between the master cylinders which can be subjected to the outlet pressure of a brake valve of the brake booster which supplies an outlet pressure proportional to the pedal travel. A compensating cylinder, which jointly executes the strokes of the drive-cylinder piston and can likewise be subjected to the outlet pressure of the brake valve transmits the actuating forces generated by the drive cylinder to the pistons of the master cylinders via a rocker articulated pivotably on the compensating piston. The effective piston surface of the compensating cylinder is somewhat larger than that of the drive piston. The stroke of the relative movements of the compensating cylinder piston in relation to the piston of the drive cylinder is limited to a distance, within which, at the start of a braking operation, the master cylinder pistons are displaceable from their basic positions, in which the outlet pressure spaces are still pressureless, to such an extent that the outlet pressure spaces of the master cylinders are shut off from the brake fluid storage tank and any further displacement leads to a pressure build-up. This ensures an "idle-travel compensation" which guarantees a close approximation to a linear relationship between the brake pressure and pedal travel.

9 Claims, 9 Drawing Sheets

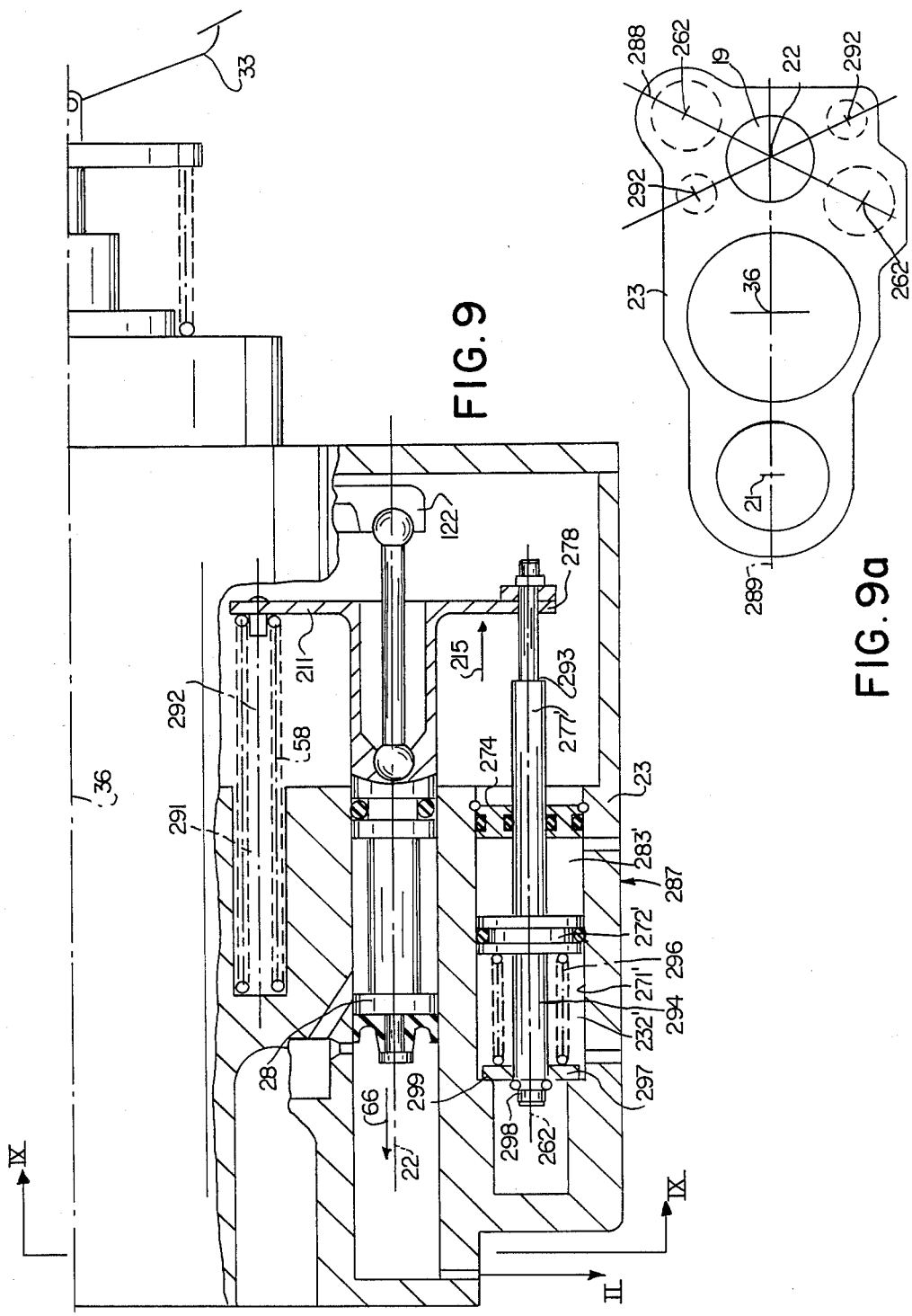

HYDRAULIC BRAKE BOOSTER ARRANGEMENT WITH PARALLEL MASTER CYLINDERS AND COMMON HOUSING FOR PIVOTABLE ROCKER

BACKGROUND AND SUMMARY OF THE INVENTION

1. Field of the Invention

The invention relates to a brake unit for controlling the brake pressures in the wheel brakes of a road vehicle which is equipped with a hydraulic dual circuit brake system actuable via a hydraulic brake booster.

2. Description of the Prior Art

A brake unit of this type is known from German Patent Specification No. DE 2,453,573 C2.

In this known brake unit, two jointly actuable master cylinders, each assigned to one of the two brake circuits of the vehicle, are arranged in a twin design next to one another in a common housing, in order to achieve a shorter overall length, as compared with a tandem master cylinder. The two master cylinders are designed as static master cylinders, that is to say the brake circuits take the form of closed brake circuits. The brake booster comprises a drive cylinder, the drive pressure space of which can be subjected to an auxiliary pressure proportional to the force with which the driver actuates the brake pedal of the brake system. This auxiliary pressure is derived from an auxiliary pressure source by a brake valve designed as a proportional valve.

The boosted actuating force generated by the drive cylinder of the brake booster acts on a rocker which is mounted on a bearing part, displaceable together with the drive piston of the drive cylinder, so as to be pivotable about an axis extending perpendicularly to the plane marked by the central longitudinal axes of the two master cylinders. The rocker is supported axially by its free ends, for example each via a tappet, on the pistons of the two master cylinders. This support is torque-compensated, in that the ratio $L_V/L_H$ of the effective lengths $L_V$ and $L_H$ of the rocker arms corresponds to the ratio $F_H/F_V$ of the surface $F_H$ of the master cylinder piston limiting the outlet pressure space of the master cylinder assigned to one brake circuit II, and of the surface $F_V$ of the master cylinder piston limiting the outlet pressure space of the master cylinder assigned to the other brake circuit I.

The brake valve is incorporated in the piston of the drive cylinder of the brake booster. Furthermore, the brake booster is designed so that, in the event of a failure of its auxiliary pressure source, the pedal force acts, via the valve body of the brake valve, on the piston of the drive cylinder and, via this, on the rocker. Thus, in the event of such a malfunction, the brake system remains operational, albeit without boosting, and a braking deceleration meeting minimum statutory requirements can still be achieved.

In the known brake unit, although not stated explicitly in DE 2,453,573 C2, but nevertheless absolutely essential to ensure the operating capacity of the known brake unit, the outlet pressure spaces of the two master cylinders, each assigned to a brake circuit, are each delimited by a flange of the master cylinder pistons from a usually annular follow-up space in communication with the brake fluid storage tank in each of the possible positions of the master cylinder pistons. In the position of the master cylinder pistons corresponding to the non-actuated state of the brake system, the outlet pressure spaces of the two master cylinders are also either in communication with the brake fluid storage tank each via a compensating bore shut off after a short initial portion of the pressure build-up stroke of the master cylinder pistons or with the respective follow-up space of the particular master cylinder and therefore likewise with the brake fluid storage tank via a central valve of the particular master cylinder piston which assumes its blocking position after a short initial portion of the pressure build-up stroke of the latter.

A disadvantage of this is that, because of the relatively long closing stroke of such central valves or because of the closing travel required for shutting off the compensating bores, relatively long idle strokes of the pistons have to be allowed for before the build-up of brake pressure in the two master cylinders can finally start. The result of this is an unfavorable brake-pressure/brake-pedal travel characteristic, which is such that the brake pressure increases only slightly at the start of the pedal or piston stroke and experiences an increase proportional to the pedal travel only after relatively long pedal travels have taken place. The response behavior of the brake system is therefore relatively sluggish. In addition, because of production tolerances the brake-pressure/pedal-travel characteristics of such brake units with a twin arrangement of two static master cylinders are subject to considerable spreads which make it difficult to adjust the brake system to a particular brake pressure distribution in an appropriate way.

SUMMARY OF THE INVENTION

The object of the invention is, therefore, to improve a brake unit of the type mentioned in the introduction, to the effect that it guarantees a more sensitive response behavior to the brake system in terms of a sharply defined and substantially linear relationship between the pedal travel and the brake pressure within narrow tolerance limits.

According to the invention, this object is achieved by additional features.

According to these, when the brake system is actuated, an additional compensating cylinder which jointly executes, as a whole, the movements of the piston of the drive cylinder of the brake booster causes an introductory displacement of the master cylinder pistons into a position, from which any further displacement of the master cylinder pistons caused as a result of the movement of the drive cylinder piston leads to a brake pressure increase exactly or virtually exactly proportional to the pedal travel. The stroke of this introductory displacement of the master cylinder pistons is limited to their idle travel which is otherwise to be taken into account and which is, as it were, compensated thereby. This virtually completely prevents any influence of production tolerances on the brake-pressure/pedal-travel characteristic of the brake unit according to the invention. It is therefore possible for the master cylinder pistons to have dimensions which produce a relatively flat curve of the brake-pressure/pedal-travel characteristic. An advantageous consequence of this is also that, in the event of a failure of the auxiliary pressure source, that is to say if braking can be obtained by pedal force only, high brake pressures can still be generated without the need to design the master cylinder pistons in a special way, for example as step pistons, in order to obtain a so-called transmission-ratio jump.

Alternative designs of the drive cylinder and of the compensating cylinder are provided which are suitable for space-saving incorporation in the brake unit according to the invention, with them being arranged between its master cylinders in spacial terms.

As result of the incorporation of the brake valve embodiments of the drive cylinder of the brake unit result is achieved.

The advantage of the claimed design of the brake unit with an incorporated brake valve is that control edges of its valve piston, which in the basic position of the functional elements of the brake unit, are to assume a specific desired position in relation to flow paths to be shut off and/or to be opened, can be adjusted and, if appropriate, also readjusted very accurately in relation to these desired positions, in order to achieve a sought-after response behavior of the brake system as a whole and a sought-after brake-pressure/pedal-travel characteristic.

This purpose is also served by a restoring spring which develops a progressive regulating force, counter to which the piston of the compensating cylinder is displaceable in the introductory phase of a braking operation.

Other objects, advantages and novel features of the present invention will become apparent from the following detailed description of the invention when considered in conjunction with the accompanying drawings.

BRIEF DESCRIPTION OF THE DRAWINGS

FIG. 9 is a cutaway view of a further exemplary embodiment of a brake unit with a double-acting regulating cylinder for antilock and propulsion control of the driven vehicle axle, in a representation corresponding to FIGS. 3 to 8.

FIG. 9a is a view of the brake unit according to FIG. 9 in the direction of the arrow IX, to explain the arrangement of the master cylinders and regulating cylinders for the antilock and propulsion control.

DETAILED DESCRIPTION OF THE PREFERRED EMBODIMENTS

Figure 1:
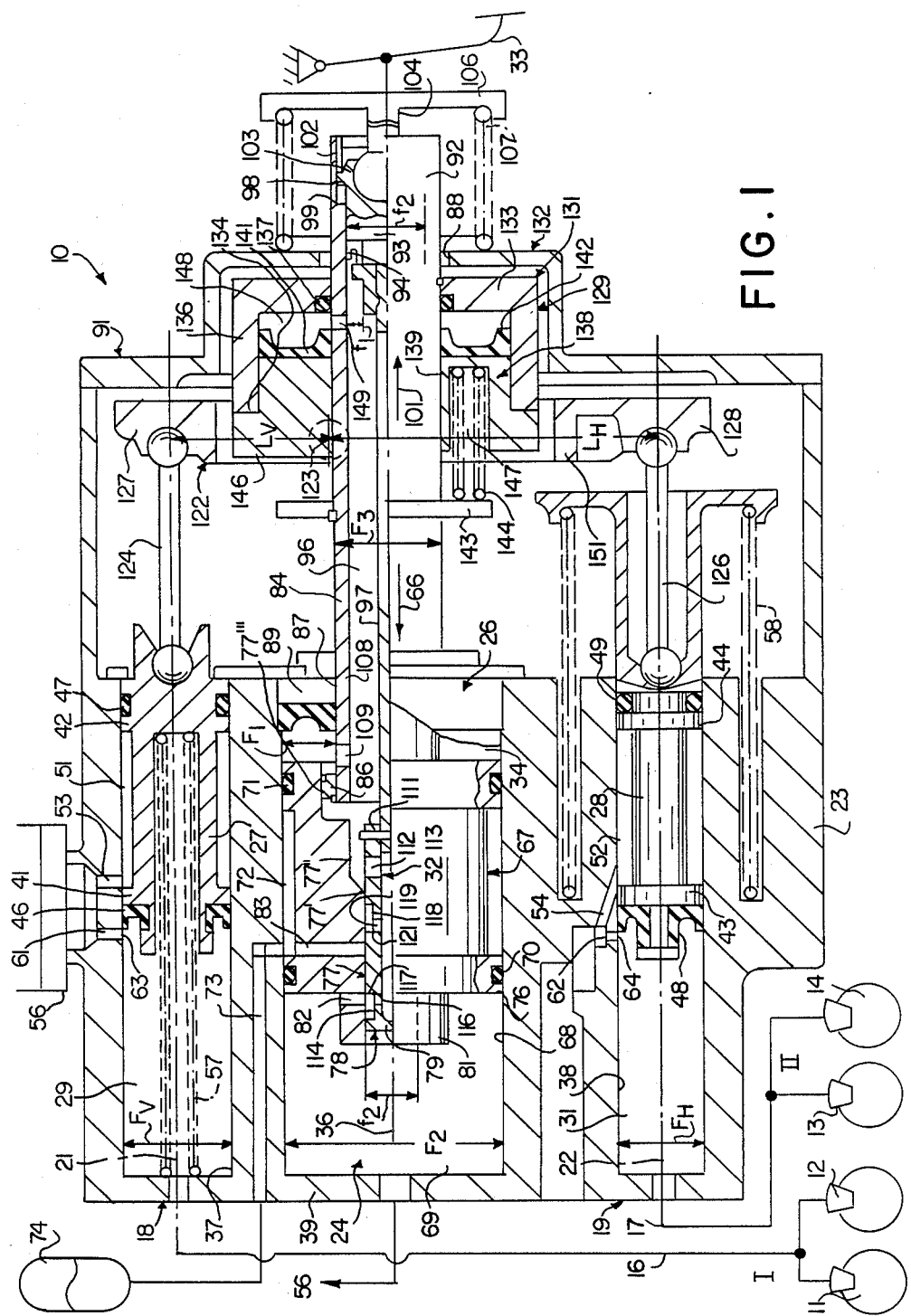
FIG. 1 is a schematical cross-sectional view of a first exemplary embodiment of a brake unit according to the invention which has a hydraulic brake booster and which comprises two static master cylinders, a drive cylinder and a compensating cylinder for eliminating the idle travel of the pistons of the master cylinders, in a section along the common plane of the central axes of the master cylinder and of the brake booster.

FIG. 1 illustrates a brake unit 10, according to the invention, for a road vehicle with a hydraulic dual-circuit brake system which comprises a front-axle brake circuit I and a rear axle brake circuit II.

These brake circuits I and II are represented in FIG. 1 by the diagrammatically indicated front-wheel brakes 11 and 12, rear wheel brakes 13 and 14 and main lines 16 and 17 of the front-axle brake circuit I and rear axle brake circuit II, respectively, which lead from the brake unit 10 to these wheel brakes 11 to 14.

The brake circuits I and II are designed as so-called static brake circuits which are each subjected to pressure, within the framework of the brake unit 10, by a static master cylinder 18 and 19.

Within the housing 23 of the brake unit 10, the so-called twin arrangement is chosen for these master cylinders 18 and 19, so that the master cylinders 18 and 19 are arranged at a lateral distance next to one another, with their central longitudinal axes 21 and 22 parallel to one another. Thus, a considerable reduction of the overall length of the brake unit 10, as measured in the direction of these longitudinal axes 21 and 22 is achieved as compared with an otherwise conventional tandem arrangement.

Also incorporated in the brake unit 10 is a hydraulic brake booster 24, comprising a hydraulic drive cylinder 26, and brake valve 32. Hydraulic drive cylinder 26, when subjected to pressure, causes the pistons 27 and 28 of the master cylinders 18 and 17 to be drivable for the purpose of a pressure build-up in their outlet-pressure spaces 29 and 31. The brake valve 32 feeds a control pressure, proportional to the actuation force of the brake pedal 33 for the build-up of brake pressure, into the drive pressure space 34 of the drive cylinder 26 to cause the hydraulic brake boosting desired. Drive cylinder 26 is illustrated as a hydraulic linear motor arranged between the master cylinders 18 and 19, with its central longitudinal axis 36 parallel to and coplanar with the central longitudinal axes 21 and 22.

The housing bores 37 and 38, in which the pistons 27 and 28 of the master cylinders 18 and 19 are arranged displaceably, are limited fixedly by the end-face wall 39, on the left according to FIG. 1, of the brake-unit housing 23. The pistons 27 and 28 which form the axially movable limitations of the outlet-pressure spaces 29 and 31 of the master cylinders 18 and 19, each have axial spaced two piston flanges 41, 42 and 43, 44 which are sealed off from the housing bores 37 and 38 by annular gaskets 46, 47 and 48, 49. An annular follow-up space 51, 52 is limited, within the respective housing bore 37, 38, by the piston flanges 41, 42 and the piston flanges 43, 44 of the piston 27 and 28, respectively. The follow-up spaces 51 and 52 are constantly connected to the brake-fluid storage tank 56 of the brake system via a follow-up channels 53 and 54, respectively.

The annular gaskets 46 and 48, between follow-up spaces 51 and 52 and outlet-pressure spaces 29 and 31 of the respective master cylinders 18 or 19, are designated as lip gaskets which, in interaction with overflow bores, not shown for the sake of simplicity, which pass axially through the piston flanges 41, 43, also performs a function of check valves. If necessary during return movements of the pistons 27 and 28 taking place with the effect of a reduction of pressure in the outlet-pressure spaces 29 and 31, these check valves allow brake fluid to overflow from the follow-up spaces 51 and 52 of the master cylinders 18 and 19 into their outlet-pressure spaces 29 and 31.

The master cylinder pistons 27 and 38 are urged by restoring springs 57, 58 into the basic position shown, corresponding to the non-actuated state of the brake system. These restoring springs 57, 58 can be clamped within the cylinder bore 37 between the end-face wall 39 and the piston 27 as shown for spring 57 or external the bore 31 as shown for spring 58.

Compensating flow paths or snifting bores 61 and 62 are opened in the basic position or basic positions of the pistons 27 and 28 of the master cylinders 18 and 19 and via which brake fluid can flow from the brake-fluid storage tank 56 into the outlet-pressure spaces 29 and 31 or back from these to the brake-fluid storage tank. Upon brake system actuation, and a displacement of the master cylinder pistons 27 and 18 in the direction of the arrow 66 to effect a build-up of brake pressure, the mouth orifices of snifting bores 61 and 62 are crossed by the respective annular gasket 46 and 48, and consequently the outlet-pressure spaces 29 and 31 are shut off from the brake-fluid storage tank 56. In the course of the further displacement of the pistons 27 and 28, in the direction of the arrow 66, the build-up of brake pressure in the outlet-pressure spaces 29 and 31 of the brake unit 10 takes place. It goes without saying that, instead of such snifting bores 61 and 62, it is also possible to provide, on the master cylinder pistons 27 and 28, central valves of known design which, in the basic position of the pistons, are held in their open position, in which the outlet-pressure space 29 or 31 of the master cylinder 18 or 19 is in communication with the follow-up space 51 or 52. As soon as the pistons 27 and 28 have executed an initial portion of their stroke corresponding to the closing travel of such valves, the control valves move into the blocking position, from which any further displacement of the pistons 27 and 28 in the direction of the arrow 66 is linked to a pressure build-up in the particular outlet-pressure space 29 or 31.

Starting from the basic position shown, the pistons 27 and 28 of the master cylinders 18 and 19 must, at all events, execute an initial "idle travel" before a pressure build-up proportional to the pedal travel starts in the outlet-pressure spaces 29 and 31 of the master cylinders 18 and 19. The minimum value of this idle travel is determined by the initial proportion of the particular piston stroke which must be executed before the snifting bores 61 and 62 are shut off from the respective outlet-pressure spaces 29 and 31.

The drive cylinder 26 of the brake booster 24, which generates the actuating force exerted on the pistons 27 and 28 of the master cylinders 18 and 19, is designated as a single-acting linear cylinder. A piston 67 of drive cylinder 26 is guided displaceably in a central bore 68 of the housing 23 in the direction of the central longitudinal axis 36 of this central bore 68 and is sealed off from the latter. The piston 67 can be displaced in the direction of the arrow 66 by the outlet pressure of the brake valve 32 proportional to the pedal force or to the pedal travel.

The control bore 68 receiving the drive piston 67 has, in the axial direction, the same extent as the bores 37 and 38 of the master cylinders 18 and 19, and is closed off on the side on the left according to FIG. 1, by a portion of the end-face wall 39 of the housing 23.

A compensating space 69, limited fixedly relative to the housing by this portion of the end-face wall 39 and movably by the piston 67 and located in the drive cylinder 26, is connected to the brake-fluid storage tank 56.

The piston 67 of the drive cylinder 26 is sealed off from the central bore 68 by two annular gaskets 70, 71 which are fixed to flanges of the piston 67 and which are axially spaced from one another by a distance somewhat greater than the maximum stroke of the piston 67, also corresponding to the maximum strokes of the master cylinder pistons 27 and 28. An inlet pressure space 72, formed by a shallow annular groove in piston 67, between flanges of the piston 67 which receive the annular gaskets 70 and 71, is connected, via a housing channel 73, to the high-pressure outlet of a hydraulic auxiliary-pressure source, shown as a pressure accumulator 74, of the brake booster 24. In the illustrated basic position of the drive-cylinder piston 67, corresponding to the non-actuated state of the brake system, the housing channel 73 opens out immediately next to the left-hand flange 76 of the drive piston 67, that carries the sealing ring 70 delimiting the pressureless compensating space 69 from the inlet-pressure space 72. Thus, the communicating connection between the inlet-pressure space 72 and the auxiliary-pressure source 74 is preserved within the possible stroke of the drive piston 67.

The drive piston 67 has a central continuous longitudinal bore 77 which widens in a step-shaped manner towards the drive pressure space 34. Guided displaceably in a pressure tight manner in the bore step 77' of least diameter, extending between the compensating space 69 and the somewhat wider middle bore step 77", is a valve piston 78 of the brake valve 32. The valve piston 78 is of elongate pot-shaped design having bottom 79 closing off the smallest bore step 77' from the compensating space 69 in a pressure tight manner. The end portion of the narrowest bore step 77' which receives the piston bottom 79 of the valve body 78 extends within a short piston extension 81 which projects into the compensating space 69. The outside diameter of the piston extension 81 is clearly less than that of the adjacent piston flange 76 which is sealed off from the central housing bore 68 by the annular gasket 70.

The piston extension 81 is provided with a compensating channel 82 which takes the form of a transverse bore and connects the compensating space 69 with portion 77' of the central bore 77 of the piston 67 which is sealed off by the piston bottom 79. Within that portion of the drive piston 67 between the annular gaskets 70 and 71, there is a second transverse channel 83 which opens, at an axial distance from the compensating channel 82 into the narrowest bore portion 77' of the central bore 77 of the piston 67 and is connected in a communicating manner to the annular-gap-shaped inlet-pressure space 72 of the brake booster 24.

Within the bore step 77''' of largest diameter of the drive piston 67, an elongate tubular piston rod 84 is connected fixedly to the drive piston 67. The outside diameter of piston rod 84 is somewhat less than the diameter of the widest bore step 77''' of the drive piston 67 and the inside diameter of which corresponds to the diameter of the middle bore step 77'' of the drive piston 67. This piston rod 84 is sealed off from the widest bore step 77''' of the drive piston 67 by an annular gasket 86. The piston rod 84 passes through mutually aligned central bores 87 of a partition-wall 89, which forms a limitation, fixed relative to the housing, of the drive pressure space 34, limited movably by the drive piston 67, and central bore 88 through a housing cover 91 which closes off the housing 23 of the brake unit 10 relative to the outside on the same side as the pedal. The length of end portion 92 of the piston rod 84 which projects from the housing 23, 91 in the illustrated basic position of drive piston 67 corresponds at least to the maximum stroke of the drive piston 67, so that the piston rod 84 remains guided in the central bore of the housing cover 91 in every operating state of the brake system.

An actuating piston 93 is guided displaceably within that end portion 92 of the piston rod 84 at least in the basic position shown, and is sealed off from the elongate cylindrical hollow space 96 of the piston rod 84 which is open towards the central bore 77 of the drive piston 67 by an annular gasket 94 arranged fixedly relative to the piston. The actuating piston 93 is connected fixedly in terms of displacement to the valve piston 78 of the brake valve 32 by an elongate push rod 97. Possible relative movements of the composite piston structure, comprising the actuating piston 93, the push rod 97 and the brake-valve piston 78, relative to the piston rod 84 are limited by stop flange 98 of actuating piston 93. In the direction of the arrow 66, the stop flange 98 abuts a stop step 99 of the piston rod 84 and, in the opposite direction represented by the arrow 101, the stopflange 98 abuts a stop ring 102 inserted into the end portion 92 of the piston rod 84. The axial distance between the annular stop face 103 of this stop ring 102 and the stop step 99 of the piston-rod portion 92 is selected just large enough to ensure that the necessary brake-pressure and boosting control functions can be performed within the relative movement stroke of the valve body 78 in relation to the drive piston 67 made possible thereby.

The brake pedal 33 is connected positively and non-positively to the actuating piston 93 by a ball-and-socket joint connection via a tappet 104, and can be actuated counter to the restoring force of a path simulation spring 107 supported on the housing cover 91 and on a tappet flange 106. The tubular piston rod 84 is sealed off, by an annular gasket 108 and designed as a lip gasket, both from the central housing bore 68 and from the central bore 87 of the partition-wall part 89, on which the annular gasket 108 is supported in the axial direction. As seen in the axial direction, a transverse bore 109 is provided in the piston rod 84 between this annular gasket 108 and the annular gasket 86 sealing off the inner end portion of the piston rod from the largest bore step 77''' of the drive piston 67. The drive pressure space 34 of the drive cylinder 26 communicates with the interior 96 of the piston rod 84 via transverse bore 109 and thereby also with the middle bore step 77'' and that part of the larger bore step 77'' of the drive piston 67 which communicates with step 77''.

An overflow orifice 112 is provided in that portion of the brake valve piston 78 casing 111 projecting into the middle bore step 77'' of the drive piston 67. The axial extent and arrangement of overflow orifice 112 is such that, in any of the possible positions of the valve piston 78 in relation to the drive piston 67, the interior 113 of the valve piston 78 is in communication with the middle bore step 77'' of the drive piston 67 and, via the transverse bore 109 of the piston rod 84, also with the drive pressure space 34 of the drive cylinder 26.

The valve piston 78, in the part of its casing 111 immediately adjacent to the piston bottom 79, is provided with a first outer annular groove 114 which communicates with the interior 113 of the valve piston 78 via a transverse bore 116. In the illustrated basic position of the valve piston 78 of the brake valve 32 and of the drive piston 67 of the brake booster 24, there is partial overlapping of the inner mouth orifice of the compensating channel 82 of the piston 67 with the first annular groove 114 of the valve piston 78. Thus, in this basic position of the brake valve, the drive pressure space 34 of the drive cylinder 26 communicates with the compensating space 69 of the brake booster 4. A groove flank 117 of the annular groove 114, which is on the inside, as seen in the axial direction, and which is on the right according to FIG. 1, extends within the mouth orifice of the compensating channel 82 and forms a control edge. Upon actuation of the brake system and the resulting displacement of the valve piston 78 in the direction of the arrow 66, the control edge crosses the mouth of the compensating channel 82, shutting off the compensating space 69 from the interior 113 of the valve piston 78 and consequently also from the drive pressure space 34 of the drive cylinder 26.

The valve piston 78 is provided with a second outer annular groove 118 which likewise communicates with the interior 113 of the valve piston 78 via a transverse bore 119.

This second annular groove 118 is so arranged between the first annular groove 114 and the overflow orifice 112, as seen in the axial direction, that its outer groove flank 121, on the left according to FIG. 1, enters the clear cross-sectional region of the inner mouth orifice of the transverse channel 83 connecting the inlet-pressure space 72 to the central bore 77 of the drive piston 67. Thereby high outlet pressure of the auxiliary-pressure source 74 is fed into the drive pressure space 34 of the drive cylinder 26 only when and preferably precisely when the inner control edge 117 of the first outer annular groove 114 has completely crossed and therefore closed the inner mouth orifice of the compensating channel 82 of the drive piston 67.

As a result of this, pressure acting on the annular surface of drive piston 67 limits the drive pressure space 34 and has an effective value $F_1$ of the surface difference $F_2-F_3$ between the cross-sectional surface $F_2$ of the central bore 68 and the total cross-sectional surface $F_3$ of the piston rod 84, a force exerted in the direction of the arrow 66 and ensuring brake boosting acts on the drive piston 67. This force is transmitted to master cylinder pistons 27 and 28 via a rocker designated as a whole by 122, coupled in terms of movement in the axial direction to the drive piston 67 or piston rod 84 and pivotable about an axis 123 extending at right angles to the central longitudinal axis 36 of the piston rod 84 and at a lateral distance from the central longitudinal axis 36, and via push rods 124 and 126 which, in the arrangement illustrated, are supported between the rocker arms 127 and 128 and on the master cylinder pistons 27 and 28. Thus, the master cylinder pistons 27 and 28 are displaced to the effect of a build-up of brake pressure in the outlet-pressure spaces 29 and 31 of the master cylinders 18 and 19.

The actuating piston 93 is also subjected to the outlet pressure, feed into the drive pressure space 34, of the brake valve 32, the pressure outlet of which is formed by the overflow orifice 112, on an annular surface, the amount $f_1$ of which is determined by the difference $f_2-f_3$ between the cross-sectional surface $f_2$ of that part of the central hollow space of the piston rod 84 receiving the actuating piston 93 and the cross-sectional surface $f_3$ of the smallest bore step 77' of the central bore 77 of the drive piston 67. A force directed in the direction of the arrow 101, that is to say in the opposite direction to the pedal force, is thereby exerted on the actuating piston 93 and, when it exceeds the pedal force, results in a displacement of the valve piston 78 in the direction of the arrow 101 in relation to the drive piston 67. The inlet-pressure space 72 thereby is shut off from the drive pressure space 34 once again, and instead the drive pressure space 34 is once more connected to the compensating space 69 of the brake booster. As a result of this interaction of the brake valve 32 and of the drive cylinder 26 of the brake booster 24, a pressure proportional to the pedal force is always fed into the drive pressure space 34 and desired brake boosting is consequently achieved.

The dimensions of the cross-sectional surfaces $F_V$ of the housing bore 37 of the master cylinder 18 for the front-axle brake circuit I and $F_H$ of the housing bore 38 of the master cylinder 19 for the rear axle brake circuit II are such that, for the same displacement travels of the master cylinder pistons 27 and 28 in the outlet-pressure spaces 29 and 31 of the master cylinders 18 and 19, the same pressure is built up. Also, the surface ratio $F_V/F_H$ corresponds to the brake pressure distribution $B_{VA}/B_{HA}$ arrived at as a fixed setting, $B_{VA}$ denoting the front-axle brake pressure fraction and $B_{HA}$ denoting the rear axle brake pressure fraction.

The ratio L of the effective lengths $L_V$ and $L_H$, measured from the pivot axis 123 of the rocker 122 to the central longitudinal axes 21 and 22 of the master cylinders 18 and 19 or of the push rods 124 and 126, of the rocker arms 127 and 128, via which the drive force generated by the drive cylinder 26 is transmitted to the master cylinder pistons 27 and 28, corresponds to the ratio F This ensures that when the brake system is actuated, the pistons 27 and 28 of the master cylinders 18 and 19 are displaced uniformly in the direction of the arrow 66, that is to say the rocker 122 maintains its orientation, shown in FIG. 1, at right angles to the piston rod 84. The push rods 124 and 126 are connected, via ball-and-socket joints, to the rocker 122 and to the respective pistons 27 and 28 of the master cylinders 18 and 19.

In order largely to avoid "spreads" of the pedal characteristic of the brake system caused by production tolerances of the master cylinder pistons 27 and 28, the housing 23 and/or the brake valve 32, that is to say in order to keep the spread range, within which the brake pressure linked to a specific actuating travel of the pedal can vary, as narrow as possible and consequently achieve a sharply defined response behavior of the brake unit 10 and of the brake system of the vehicle as a whole, there is a provided compensating cylinder 129. In the introductory phase of brake actuation by increased pressure being fed into the drive pressure space 34 of the drive cylinder 26 via the brake valve 32, the compensating cylinder 129 is likewise subjected to this pressure. This causes a limited introductory displacement of the rocker 122 and of the pistons 27 and 28 of the master cylinders 18 and 19 in the direction of the arrow 66, even before the drive piston 67 and the connected piston rod 84 have experienced a displacement in the direction of the arrow 66.

As a result of this introductory displacement of the master cylinder pistons 27 and 28, they initially assume an advanced position, in which the outlet-pressure spaces 29 and 31 of the master cylinders 18 and 19 are already shut off from the snifting bores 61 and 62. That is to say the pistons 27 and 28 have executed their above-described "idle travels", within which no brake pressure can be built up. With a displacement of the drive piston 67 resulting from the pressure in the drive pressure space 34 of the drive cylinder 26 and with the further resulting displacement of the master cylinder pistons 27 and 28, these displacements being proportional to the pedal force and to the pedal travel, a pressure build-up taking place in virtually strict proportion to the pedal travel or to the pedal actuation force is now obtained in the master cylinder outlet-pressure spaces 29 and 31.

The compensating cylinder 129 comprises a cylindrical pot-shaped housing 131 which, as seen in the basic position illustrated, is for the most part received by a likewise cylindrical and pot-shaped bulge 132, pointing towards the brake pedal 33, of the housing cover 190. The bottom 133 of the housing part 131 is arranged immediately next to the bottom part of this bulge 132, and the annular end face 134 of the housing casing 135 points towards the rocker 122 or to the drive cylinder 26. The housing 131 is connected to the piston rod 84 which passes through a central bore of the housing bottom 133 and which is sealed off from this central bore by an annular gasket 137. Furthermore, the compensating cylinder 129 comprises an annular piston 138 surrounding the piston rod 84 coaxially over a portion of its length and having a central bore 139, through which the piston rod 84 passes. The annular end face 141 of annular piston 138 facing the housing bottom 133 is equipped with an annular gasket 142 which, in the exemplary embodiment illustrated, is designed as a lip gasket and which seals off the piston 138 both relative to the piston rod 84 and relative to the casing 136 of the housing 131. The piston 138 is guided displaceably both on the piston rod 84 and on the inner cylindrical surface of the housing casing 136.

Fastened to the piston rod 84 between the drive cylinder 26 and the compensating cylinder 129 is a supporting and stop flange 143. A compression spring 144 supported on flange 143 urges the piston 138 into its illustrated basic position which is marked by the abutting of an annular flange 146 of the piston against the annular end face 134 of the casing 136 of the housing 131. The compression spring 144 is received, over most of its length, in a recess 147 of the piston 138. Annular gasket 142 and piston 138 form the movable axial limitation of a further annular operating-pressure space 148 which is limited fixedly relatively to the housing by the bottom 133 of the housing 131. Operating pressure space 148 is connected via a transverse bore 149 of the piston rod 84, to the interior 96 of the piston rod 84 and consequently to the brake-valve outlet 112.

The rocker 122 is designed, in its central region, as a frame 151 which surrounds the piston 138 and the compensating-cylinder housing 131 at a radial distance and which, being pivotable about the axis 123, is connected in an articulated manner to the outer flange 146 of the piston 138.

The annular surface 141 of the piston 138, on which the pressure which can fed into the further drive pressure space 148 is exerted, is, for example, 20% larger than the annular surface of the drive piston 67 limiting the drive pressure space 34 of the drive cylinder 26. When the drive pressure space 148 of the compensating cylinder 129 is subjected to pressure as a result of the actuation of the brake pedal 33, its piston 138 experiences a relative displacement in relation to the piston rod 84 in the direction of the arrow 66. This relative displacement is limited as a result of the abutting of the piston 138 against the stop flange 143 of the piston rod 84. The resulting displacement of the master cylinder pistons 27 and 28 of the master cylinders 18 and 19 of the brake unit 10 is sufficient for a brake pressure build-up of a few bars, to which the wheel brakes 11 to 14 are subjected when braking is initiated. After which, with a further increase in the pedal force, an approximately line]relationship between the pedal travel and the brake pressure is obtained.

In the event of a failure of an auxiliary-pressure source 74, brake boosting ceases. However, brake pressure 20 can be built up in both brake circuits I and II solely by a pedal force which, as soon as the stop flange 98 of the actuating piston 93 comes up against the stop step 99 of the piston rod 84, is transmitted to the piston rod 84 and consequently also to the rocker and, via this, to the pistons 27 and 28 of the master cylinders 18 and 19. Since, in the event of a failure of the auxiliary-pressure source 74, the force directed counter to the pedal force and resulting from pressure exerted on the annular surface $f_1$ of the drive piston ceases, the pedal force can be utilized fully for the build-up of the brake pressure. Thus, when the pedal force is used for the brake-pressure build-up in the event of a failure of the auxiliary-pressure source, a "transmission-ratio jump" takes effect and compensates some of the loss of brake pressure caused by the absence of brake boosting.

In the event of a failure of one of the two brake circuits I or II, the other brake circuit continues to remain operational because the pivoting angle of the rocker 122 is limited as a result of a stop effect.

In this case, an idle travel and consequently a lengthening of the pedal travel first occur, until the rocker is halted as a result of a stop effect and brake pressure can be built-up in the still operational brake circuit.

Figure 2:
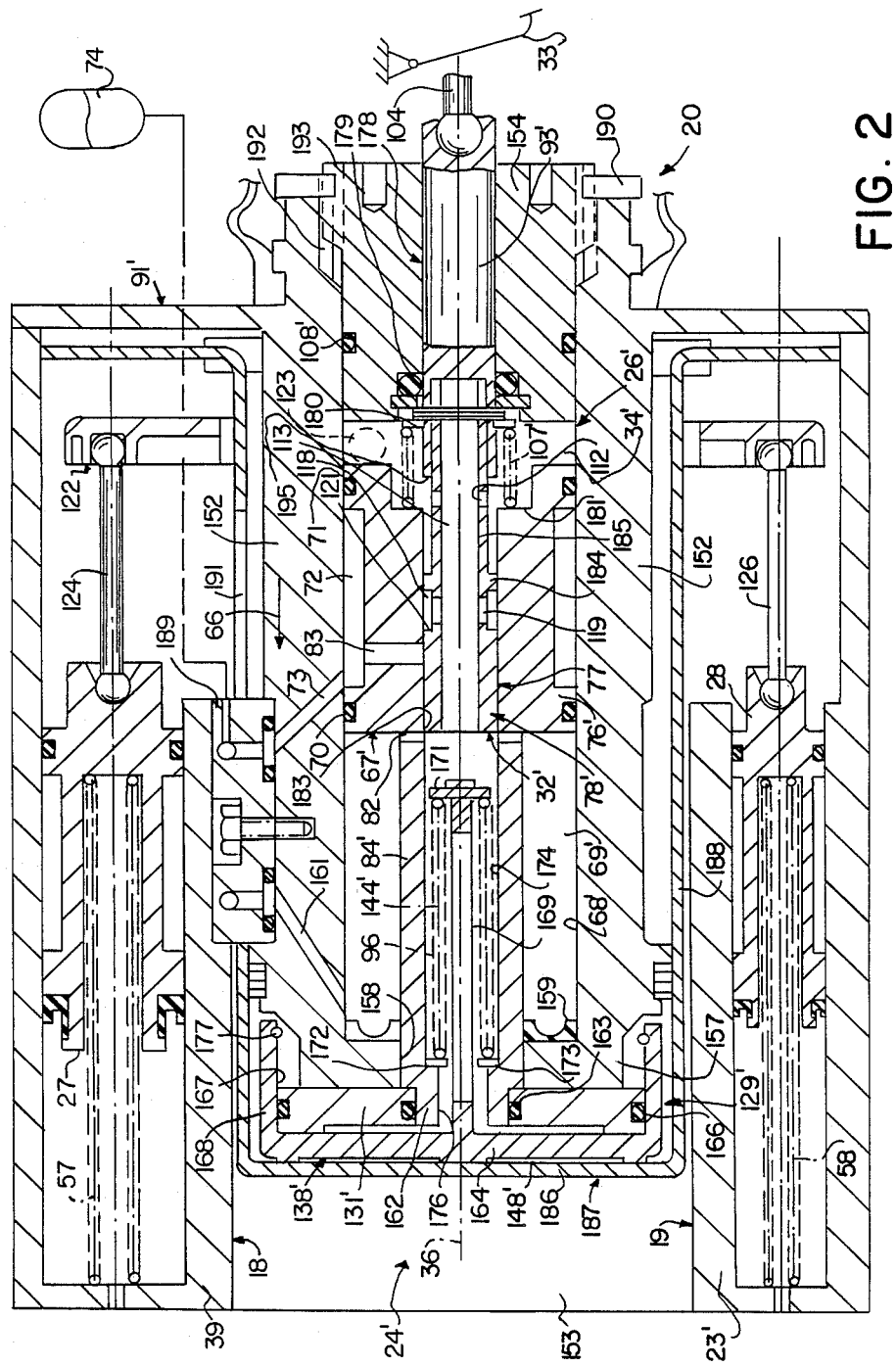
FIG. 2 is a sectional view of a further exemplary embodiment of a brake unit according to the invention in a representation truncated along the central axis of the brake booster, but otherwise corresponding to that of FIG. 1.

The brake unit 20 illustrated as a further exemplary embodiment in FIG. 2, is identical to the brake unit 10 according to FIG. 1 in terms of function. The same reference symbols as in FIG. 1 are chosen to denote elements of a brake unit 20 which are or can be identical in terms of design to corresponding functional elements of the brake unit 10 according to FIG. 1, and to that extent reference is made to the relevant parts of the description for the sake of simplicity.

Elements of the brake unit 20 shown in FIG. 2 which are similar in terms of function to functional elements of the brake unit 10 according to FIG. 1 are likewise designated by ten reference symbols which are used in FIG. 1, but which are additional given an "'".

This method of designation is also maintained for the other drawing FIGS. 3–9a.

The representation of FIG. 2 is restricted essentially to those functional elements which differ in constructional terms from the corresponding functional elements of the brake unit 10 according to FIG. 1, in particular the brake booster 24', its drive cylinder 26', the brake valve 32' and the compensating cylinder 129'.

In so far as elements of brake units according to the invention illustrated in FIG. 2 and further drawing Figures bear the same reference symbols as in FIG. 1, reference will therefore always be made to the parts of the description which belong to this.

In the brake unit 20 according to FIG. 2, the housing 152 of the drive cylinder 26' is designed as an elongate cylindrical pot-shaped part of the housing cover 91' closing off the housing 23' of the brake unit 20 on the same side as the pedal. This housing part 152, extending along the central longitudinal axis 36 of the brake booster 24' and of the housing 23', projects into a likewise pot-shaped cylindrical hollow space 153 of the housing 23' which extends between the master cylinders 18 and 19 and which is closed off by the end-face wall 39 of the housing 23' on the side located opposite the brake pedal.

The bore 68' receiving the drive piston 67' and located in the drive cylinder housing 152 is closed, on the same side as the pedal, by a closing piece 154 which is sealed off from this bore by 68' by an annular gasket 108'. The annular gasket 108' forms the limitation, fixed relative to the housing, of the drive pressure space 34', which is limited movably by the drive piston 67', of the drive cylinder 26' of the brake booster 24'. At the end of the drive-cylinder housing 152 distant from the pedal 33 and on the left according to FIG. 2, the drive-cylinder housing 152 is closed off by an end-face wall 157 which forms the limitation, fixed relative to the housing, of the compensating space 69', limited movably by the drive piston 67', of the drive cylinder 26'. The flanges of the drive piston 67' which are equipped with the annular gaskets 70 and 71 limit, in the axial direction, the inlet-pressure space 72 which permanently communicates with the auxiliary-pressure source 74 via the housing channel 73. As a result of the pedal-controlled actuation of the brake valve 32', inlet pressure space 72 can be brought into communicating connection with the drive pressure space 34' of the drive cylinder 26' and with a further drive pressure space 148' of the compensating cylinder 129' of the brake unit 20. In the brake unit 20 of FIG. 2, the piston rod 84. corresponding in functional terms to the piston rod 84 of the brake unit 10 according to FIG. 1 projects from the side of the drive piston 67' limiting the compensating space 69' and passes through a central bore 158 in the end-face wall 157 of the cylinder housing 152. The piston rod 84' is sealed off from the cylinder housing 152 by an annular gasket 159 fixed to the housing.

Once again, the piston rod 84' is elongate and in the form of a hollow tube. Its interior 96 communicates via the compensating channel 82 located immediately next to the flange 76', on the left according to FIG. 2, of the drive piston 67', with the compensating space 69' which itself is connected to the storage tank 56 of the brake system via a housing channel 161. On a free end portion 162 of the piston rod 84' protecting from the cylinder housing 152 on the end face is arranged a flange 131' in the form of an annular disc, which is sealed off from the free end portion 162 of the piston rod 84' by an inner annular gasket 163 and is displaceable together with the piston rod 84'. Flange 131' corresponds in functional terms to the compensating-cylinder housing 131 of the brake unit 10 according to FIG. 1.

This flange 131' constitutes the inner axial limitation of the drive pressure space 148' of the compensating cylinder 129', its outer axial limitation, on according to FIG. 2 being formed by the bottom part 164 of a generally pot-shaped piston 138, which corresponds in functional terms to the annular piston 138 of the brake unit 10 according to FIG. 1. The flange 131' is sealed off by an outer annular gasket 166 from the inner cylindrical surface 167 of the casing 168 of the pot-shaped piston 138'. The pot-shaped piston 138' has a central slender rod-shaped inner extension 169 which extends over most of the length of the interior 96 of the piston rod 84' and to the inner end of which, namely that facing the drive piston 67', is attached a radial supporting flange 171.

A restoring spring 144' extends between the supporting flange 171 and a thrust ring 172 inserted into the piston rod 84'. The thrust bearing 172 is supported in the axial direction on an annular step surface 173 formed between the central longitudinal bore 174 of the piston rod 84' adjacent to an of the same diameter as the central bore 77 of the drive piston 67' and a bore portion 176 of slightly smaller diameter which passes axially through the free end portion 162 of the piston rod. The restoring spring 144', in the exemplary embodiment illustrated, is designed as a helical compression spring coaxially surrounding the rod-shaped extension of the pot-shaped piston 138'. Counter to the restoring force of restoring spring 144', the pot-shaped piston 138' is displaceable relative to the piston rod 84' or to the flange 131' when, during actuation of the brake system, an increased outlet pressure of the brake valve 32' is fed into the drive pressure space 148' of the compensating cylinder 129'.

The stroke of the relative movements possible between the pot-shaped piston 138' and the piston rod 84' of the drive piston 67' of the drive cylinder 26' is limited as a result of abutting a stop ring 177, arranged on the inner face of the pot casing 168, against the outer edge of the flange 131'. To that extent, stop ring 177 is similar in terms of function to the stop flange 143 of the piston rod 84 of the brake unit 10 according to FIG. 1.

The valve piston 78' of the brake valve 32' is guided displaceably and in a pressure tight manner in the central bore 77 of the drive piston 77' and in the central bore 174 continuing this and located in the piston rod 84'. The valve piston 78' is likewise cylindrical and tubular and is connected fixedly in terms of pulling and pushing to an actuating piston 93', on which acts, via the pedal tappet 104, the pedal force exerted on the brake pedal 33 when the brake system is actuated. The actuating piston 93' is guided displaceably in a central bore 178 of the housing closing part 154 and is sealed off relative to the central bore 178 of the housing closing part 154 and relative to the drive pressure space 34' of the drive cylinder 26' by an annular gasket 179. Within the drive pressure space 34', the composite piston structure consisting of the valve piston 78' and of the actuating piston 93' is equipped with a thrust ring 180 connected firmly to the actuating piston 93'.

Between the thrust ring 180 and an annular surface 181, movably limiting the drive pressure space 34' on one side of the drive piston 67' of the drive cylinder 26' extends a helical compression spring 107' which is under moderate prestress and which is similar in functional terms to the path simulation spring 107 of the brake unit 10 according to FIG. 1.

The drive pressure space 34' of the drive cylinder 26' is in constant communication connection with the interior 113 of the valve piston 78' via an overflow orifice 112 which is designated as a transverse bore located in a region of the valve piston 78' having an outside diameter less than the inside diameter of the central bore 77 of the drive piston 67'. The end-face edge 183 of the valve piston 78' facing the piston rod 84' forms the control edge. When the brake unit 20 is actuated, the control edge 183 crosses over the compensating channel 82 and shuts off the compensating space 69' from the interior 96 of the piston rod 84', from the interior 113 of the valve piston 78', and consequently also from the drive pressure space 34' of the drive cylinder 26'.

The valve piston 78' is provided with an outer annular groove 118 which communicates with the interior 113 of the valve piston 78' via a transverse bore 119. A central flange 184 separates the annular groove 118 from the portion 185 of the valve piston 78' which is connected fixedly to the actuating piston 93'. The outside diameter of portion 185 is somewhat less than the diameter of the central bore 77 of the drive piston 67'. An outer groove flank 121, on the left according to FIG. 2, of the annular groove 118 forms a control edge. As soon as the control edge 183 has crossed over and thereby closed the compensating channel 82 when the brake system is actuated, the outer groove flank 121 enters the mouth region of the transverse channel 83 connecting the inlet-pressure space 72 to the central bore 77 of the drive piston 67'. This results in an increased pressure derived from the auxiliary-pressure source 74 being fed both into the drive pressure space 34' of the drive cylinder 26. and into the drive pressure space 148' of the compensating cylinder 129'. Because of the above-described design of the brake valve 32' which corresponds in functional terms to the brake valve 32 of the brake unit 10 according to FIG. 1, this pressure is proportional to the actuating force exerted on the brake pedal 33.

The pot-shaped piston 138' is supported on the bottom part 186 of a pot-shaped sleeve 187. The casing 188 of the sleeve 187, as seen in the basic position shown, surrounds the housing 152 of the drive cylinder 26' coaxially over virtually its entire length and is guided displaceably thereon in the axial direction. The rocker 122 of the brake unit 20 is connected to the pot-shaped sleeve 187 in an articulated manner, so as to be pivotable about the axis 123 extending perpendicularly to the drawing plane.

The restoring springs 57 and 58 engage on the pistons 27 and 28 of the master cylinders 18 and 19, and urge the master cylinders 27 and 128, the pot-shaped sleeve 187, the pot-shaped piston 138', supported on this, of the compensating cylinder 219' and the piston 67' of the drive cylinder 26' into the basic position illustrated. The valve piston 78' and, together with this, the brake pedal 33' are urged into the basic position by the path simulation spring 107'.

So that the housing channels 73 and 161 can be kept advantageously short, they are guided to a connection piece 189 which is connected firmly both to the part of the housing 23' limiting the central hollow space 153 and to the elongate cylindrical housing part 152 extending within the pot-shaped sleeve 187. To allow the necessary displacement movements of the sleeve 187 relative to the housing 23' in the direction of the arrow 66, the casing 188 of the sleeve 187 is provided with a longitudinal slot 191, through which the connection piece 189 passes radially.

In contrast to the representation of FIG. 2 selected for explanatory purposes, the housing channels 73 and 161 and the connection piece 189 are appropriately arranged such that the central axes of the housing channels 73 and 161 in the central axes of the connecting channels 189 of the connection piece which communicate with them are in a plane extending perpendicularly to the drawing plane.

The closing piece 154 has an external thread 193 meshing with an internal thread 192 of the housing cover 91'. By rotating the closing piece 154, it is possible to shift it axially and consequently adjust the control edges 183 and 121 of the valve piston 78' exactly relative to the mouth orifices of the compensating channel 82 and of the transverse channel 83 of the piston 67'. The closing piece 154 can be fixed by a lock nut 190 in the position corresponding to the ideal setting of the control edges 183 and 121.

In the brake unit 20 too, the pistons 27 and 28 of the master cylinders 18 and 19 experience a minimum displacement with the effect of a brake-pressure build-up, as soon as an increased outlet pressure of the brake valve 32' is fed into the drive pressure spaces 148' and 24' of the compensating cylinder 129' and of the drive cylinder 26' during an introductory actuation of the brake pedal 33. This results in the sensitive response behavior, already explained above, of the brake system as a whole and leads to an essentially linear pedal characteristic even at only low actuating forces. In the event of failure of the auxiliary-pressure source 74, the counter force which otherwise results when the actuating piston 93' is subjected to pressure on its surface corresponding to the cross-section of the bore 178 ceases, so that the pedal force takes full effect on the drive piston 67' as soon as the actuating piston 93' runs with its stop face 195 onto the drive piston 67'.

A series of special designs which, when used within the framework of a brake unit 10 or 12, as described with reference to FIGS. 1 and 2, make it possible to perform additional functions, in particular a simple antilock control on the rear axle (FIGS. 3 to 9) and a simple starting-slip control (FIGS. 5 to 9), are explained below with reference to FIGS. 3 to 9, for the master cylinder assigned to the brake circuit II of the driven vehicle wheels, namely the rear wheels in the explanatory example chosen.

In the master cylinder part 19 of a brake unit 10 or 20, shown in FIG. and assigned to the rear axle brake circuit II, on both sides of the housing bore 38 receiving the master cylinder piston 28 there are two blind bores 194 and 196. Each blind bore 194, 196 receive an opposed piston 197, 198 forming the axially movable limitation of respective counterpressure space 199, 201 which is limited fixedly relative to the housing by the respective inner end-face wall 202, 203 of the particular blind bore 194, 196. The opposed pistons 197 and 198 are made elongate and pot-shaped, and in the basic position show, corresponding to the non-actuated state of the brake piston. Their bottom parts 204, 206 limiting the counterpressure spaces 199, 201, are arranged in the immediate vicinity of the end-face walls 202 and 203 of the bores 194 and 196 and are sealed off relative to these bores by a lip gasket 207 fixed to the piston, as provided for the piston 197 shown in the upper part of FIG. 3, or by an annular gasket 208, as provided for the opposed piston 198 shown in the lower part of FIG. 3.

The piston 28 of the master cylinder 29 is equipped with a tubular extension 209 which points and is open towards the arm 128 of the rocker 122. The tubular extension 209 coaxially surrounds the push rod 126, via which the rocker 122 engages on the piston 28. The outside diameter of the tubular extension 209 is at most equal to the diameter of the master cylinder bore 38 and is preferably somewhat less than this. At the end of the tubular extension 209 facing the rocker arm 208, the extension 209 is equipped with a radially projecting supporting flange 211. Between the bottom parts 204 and 206 of the opposed pistons 197 and 198 and the supporting flange 211 of the piston extension 209 extend restoring springs 58 which urge the master cylinder piston 28 and rocker 122, on the one hand, and the opposed pistons 197 and 198, on the other hand, into the illustrated basic position marked by a stop effect. These restoring springs 58 are centered within the opposed pistons 197 and 198 by the inner cylindrical surfaces of the pistons and outside them by stop rods 212 which are connected fixedly to the supporting flange 211 and which, as seen in the basic position illustrated, extend a short way into the opposed piston 197 and 198. When the piston 28 has executed its maximum pressure build-up stroke, the entire length of the stop rods 212 has entered the opposed pistons 197 and 198.

If during a braking operation, a tendency of locking occurs on one of the rear wheels of the vehicle (the sensor and the processing devices necessary for detecting this can be presumed to be known), a solenoid valve 213 is commanded to move out of its basic zero position shown into its excited position I. In the basic zero position, the counterpressure spaces 199 and 201 are connected to the brake fluid storage tank and are shut off from the auxiliary pressure source 74. In the excited position I, the counterpressure spaces 199 and 201 are connected to the auxiliary pressure source 74 and are shut off from the brake fluid storage tank or the tank of the auxiliary pressure source. As a result, the opposed pistons 197 and 198 are forced in the direction of the arrow 214, to the right according to FIG. 3. When the piston bottom parts 204 and 206 run up against the free ends of the stop rods 212, and the master cylinder piston 28 is taken up so as to execute a pressure reducing movement. A pressure drop results from the enlargement of volume of the outlet pressure space 31 of the master cylinder 18 and counteracts the tendency to locking in the connected wheel brakes.

Because of the pivotable mounting of the rocker 122, a pressure drop in the rear axle brake circuit II only is possible, without any appreciable reaction on the front axle brake circuit. The central axes 214 and 216 of the opposed piston 197 and 198 are symmetrical in relation to the central axis 22 of the master cylinder 19 and are arranged so that they lie in a common plane with this, this plane preferably being perpendicular to the sectional plane selected for the illustration, in contrast to the representation chosen for explanatory purposes. Because of the relatively small surface annular gaskets 207 and 208, the frictional resistances, counter to which the displacement of the opposed pistons 197 and 198 takes place, are correspondingly low.

Figure 3:
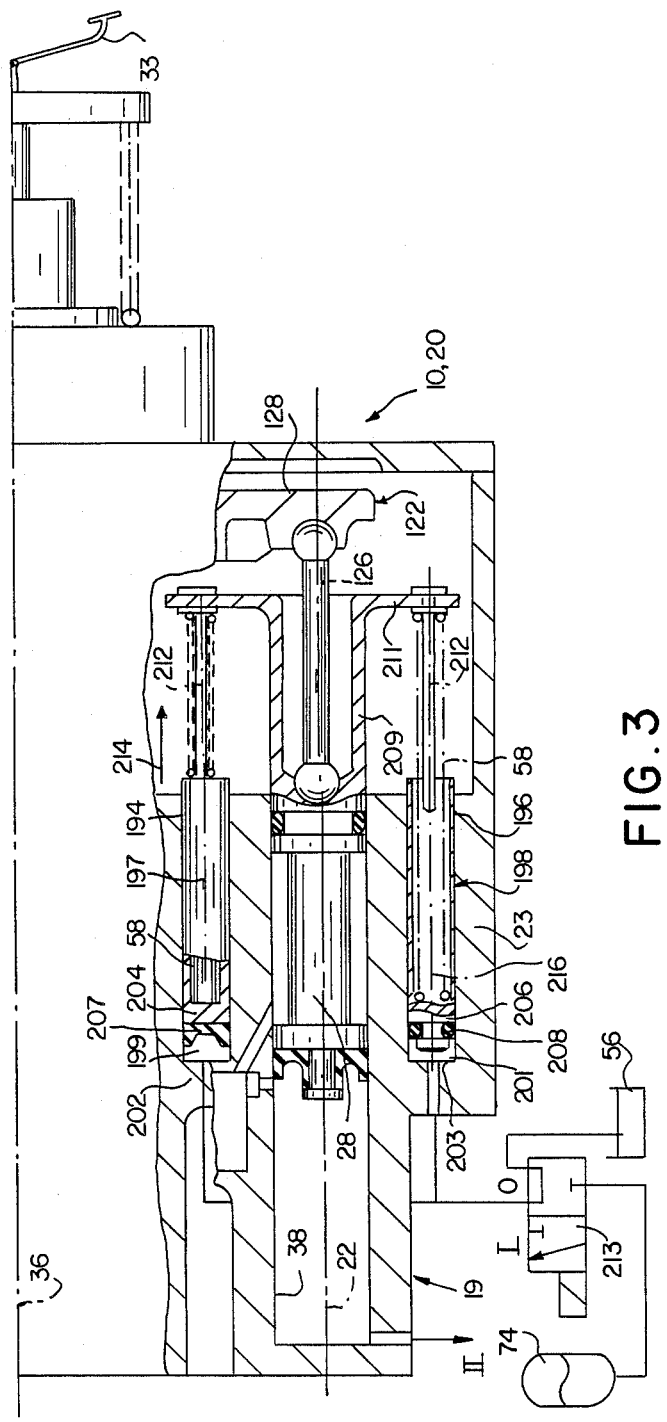
FIG. 3 is a schematic cutaway of an exemplary embodiment of a brake unit according to the invention with opposed pistons which can be used for antilock control and are assigned to the master cylinder one of the brake circuits of the vehicle and which, when subjected to pressure, cause the master cylinder piston to experience a displacement in the direction of its basic position, in a representation truncated along the central axis of the brake booster, but otherwise corresponding to that of FIG. 1.
Figure 4:
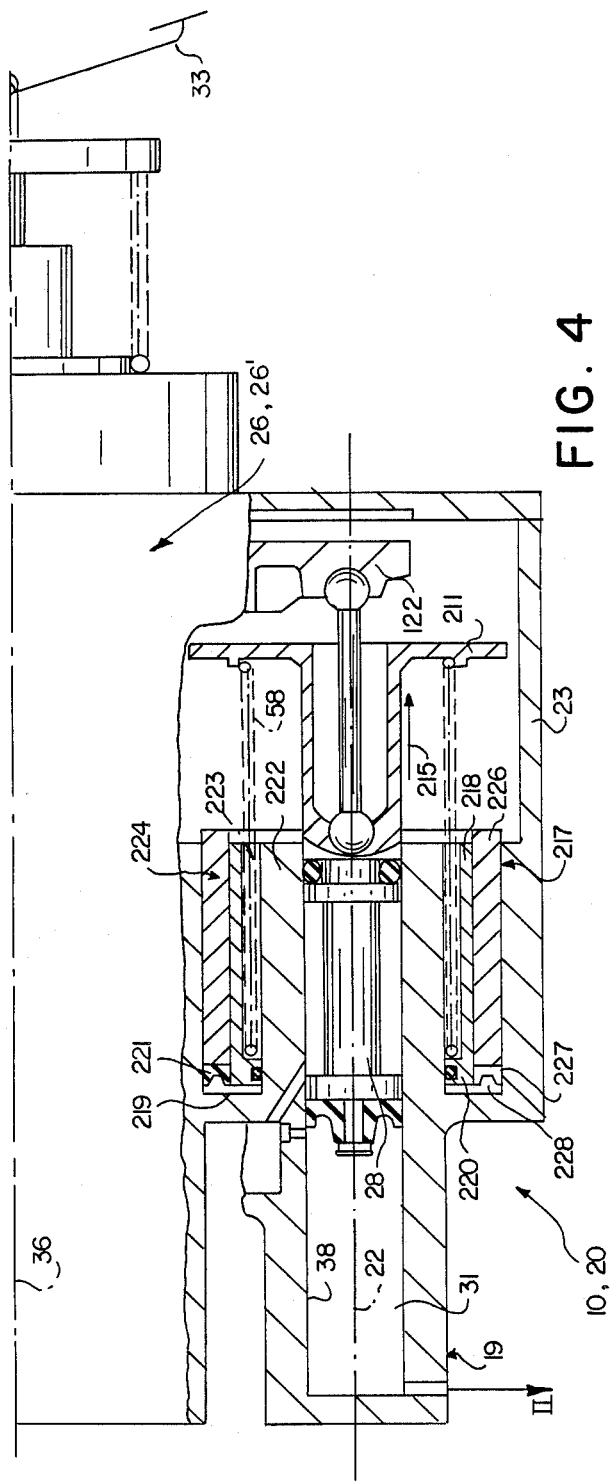
FIG. 4 is a cutaway view of a further exemplary embodiment of a brake unit according to the invention with an opposed piston which can be used for antilock control, in a representation according to that of FIG. 3.

In the exemplary embodiment according to FIG. 4, the part of the housing 23 assigned to the master cylinder 19 for the rear axle brake circuit II is provided with a deep annular groove which coaxially surrounds the central bore 38 in which the piston 28 is guided displaceably in a pressure tight manner, and which is open on the side pointing towards the rocker 122. The piston 28, including the extension part 209 and the supporting flange 211, corresponds in terms of its construction to the piston 28 according to FIG. 3. Inserted in the annular groove 217 is a cylindrical sleeve 218 which extends virtually over the entire axial depth of the annular groove 217. In the immediate vicinity of the bottom 219 of the annular groove 217, the cylindrical sleeve 18 is equipped with an annular flange 220 pointing radially inwards which is sealed off from the outer cylindrical surface of the casing region 222 of he housing 23 directly surrounding the piston 2 by an annular gasket 221. The inner annular gap remaining between the sleeve 218 and the casing region 222 receives, over some of its length, a restoring spring 58 which is supported, on the same side as the housing, on the flange 220 of the sleeve 218 and, on the same side as the piston, on the flange portion 211. The restoring spring 58, urges the piston 28 into its basic position shown, corresponding to the non-actuated state of the brake system.

A thick-walled opposed piston 226, in the form of a cylindrical shell, is guided displaceably in the radially outer annular gap 224 remaining between the sleeve 218 and the outer cylindrical limiting surface of the annular groove 217. The opposed piston 226 is sealed off from the sleeve 218, and the outer limiting wall 224 of the annular groove 217 by an annular gasket 227 which, in the exemplary embodiment illustrated, is designed as a lip gasket and which is arranged on the end face of the opposed piston 226 facing the groove bottom 219. As already described with reference to FIG. 3 with respect to the counterpressure spaces 199 and 201 illustrated there, when the counterpressure space 228, limited movably in the axial direction by the opposed piston 226 and fixedly relative to the housing by the groove bottom 219, is subjected to pressure under valve control when a tendency to locking occurs on one of the wheels of the circuit II during a braking operation, the opposed piston 226 can be displaced in the direction of the arrow 215. As soon as the piston 226 runs up against the supporting flange 211, the piston 28 of the master cylinder 19 is displaced with the effect of a pressure reduction in the brake circuit II. The elements of a brake unit 10 or 20 which are shown in FIG. 4 are completely identical in functional terms to the elements shown in FIG. 3.

The elements of the brake unit according to FIG. 4 which are necessary in order to achieve the antilock control function are characterized by their constructively simple and rotationally symmetrical design.

Figure 5:
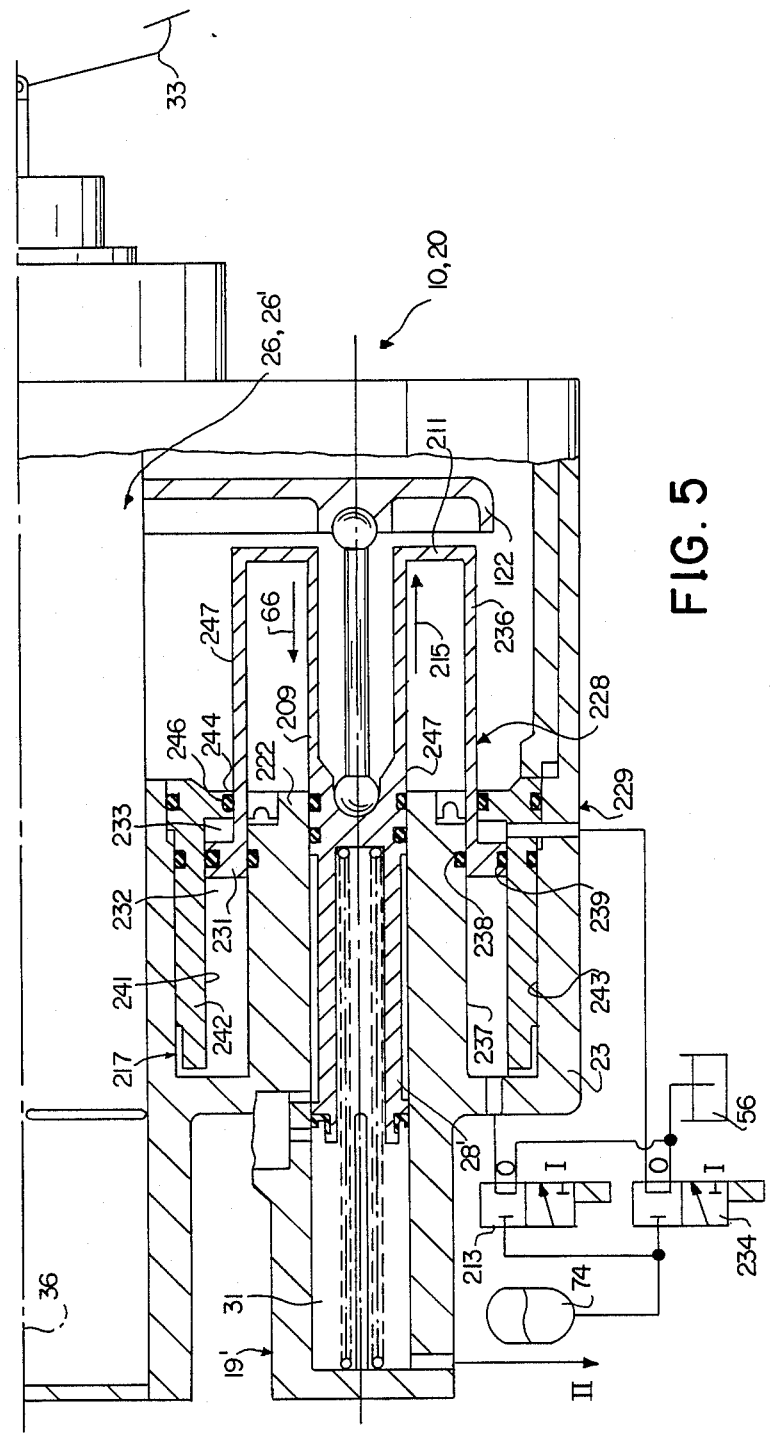
FIGS. 5 and 6 are cutaway views showing details of the master cylinder, assigned to the brake circuit of the driven vehicle wheels, of a brake unit according to FIGS. 1 or 2, with devices both for antilock control and for propulsion control, in a representation corresponding to FIGS. 3 and 4.

Under the exemplary embodiment illustrated in Figure 5, the part of a master cylinder 19' which is assigned to the rear axle brake circuit II is of a design similar to that of the master cylinder 19 according to FIG. 3, but which differs from this, in that the restoring spring 58 which urges the master cylinder piston 28' into its basic position shown, is one again arranged within the outlet pressure space 31 of the master cylinder 19'. Another difference is that a piston 228, of a double-acting regulating cylinder 229 is connected to the master cylinder piston 28'. The two working spaces 232 and 233, delimited movably from one another in the axial direction by a flange 231 of the piston 228 of the double acting regulating cylinder 229 are alternately subjected to pressure and relieved of pressure. With the brake system actuated, the piston 228 is displaceable in the direction of the arrow 215 counter to the hydraulically boosted actuating force with the effect of a pressure reduction in the outlet pressure space 31 of the master cylinder 19'. Without the brake system being actuated, the piston 228 is displaceable with the effect of a pressure build-up in the outlet pressure space 31 of the master cylinder 19', that is to say in the direction of the arrow 66.

The displacement of the master cylinder piston 28' in the direction of the arrow 215, necessary in order to stop a tendency to locking on one or both of the vehicle wheels of the rear axle brake circuit II, is obtained by subjecting the working space 232 to pressure. As already explained with reference to FIG. 3, this is achieved by activating a solenoid valve 213 by a pressure reduction control signal from an electronic control unit (not shown) of th antilock device.

To control the drive-slip control function (ASC function), there is a second solenoid valve 234 which is designed as a ⅜-way valve. In the basic position 0, a second working space 233 of the double-acting regulating cylinder 229 is connected to the brake fluid storage tank 56, and is shut off from the auxiliary pressure source 74. In the excited position I, where the second solenoid valve 234 is controlled by an output signal from an electronic control unit (not shown) of the ASC control device, when a tendency to spinning occurs on at least one of the driven vehicle wheels, the auxiliary pressure source 74 of the brake booster 24 or 24' is connected to the second working space 233, and is shut off from the brake fluid storage tank 56.

The piston 228 of the double-acting regulating cylinder 229 is designed as a cylindrical sleeve, the casing 236 of which is connected fixedly to the supporting flange 211 projecting radially from the end of the piston extension 209. The piston 228 is guided displaceably by casing 236, on the circular-cylindrical outer surface 237 of the inner casing region 222 of the housing 23 surrounding the piston 28' of the master cylinder 19. The piston 228 is sealed off from this outer surface 237 by an annular gasket 238 fixed to the housing and arranged on that end portion of this inner casing region 222 of the housing 23 which is located on the same side as the rocker.

A flange 231 projects radially outwards from the inner edge of the casing 236 and into the annular groove coaxially surrounding the housing casing 222. The flange 231 is sealed off from the other casing surface 241 of a cylindrical sleeve 242 by an annular gasket 239 fixed to the piston. The cylindrical sleeve 242 is inserted into the annular groove 217 and is sealed off from the cylindrical housing surface 243 limiting the annular groove 217 on the outside. The cylindrical sleeve 242 is equipped, on its outer end portion facing the rocker 122, with a flange 244 pointing radially inwards, which is sealed off from the radially outer casing surface 247 of the casing 236 of the piston 228 of the double-acting regulating cylinder 229 by an annular gasket 246.

The operating space 233 in the form of an annular gap is limited fixedly relative to the housing by flange 244 of the sleeve 242 and is limited movably by the radial flange 231 of the piston 228 which causes the drive-slip control on the rear axle. As a result of the feeding of the outlet pressure of the auxiliary pressure source 74 into the working space 232 in the form of an annular gap, extending between the bottom of the groove 217 and the flange 231 of the piston 228 of the double acting regulating cylinder 229, if required the antilock control function of the brake unit can be achieved on the rear axle of the vehicle. In the design of a brake unit 10 or 20 shown in FIG. 5, altogether a space-saving coaxial arrangement of the elements necessary for antilock and drive-slip control is obtained.

Figure 6:
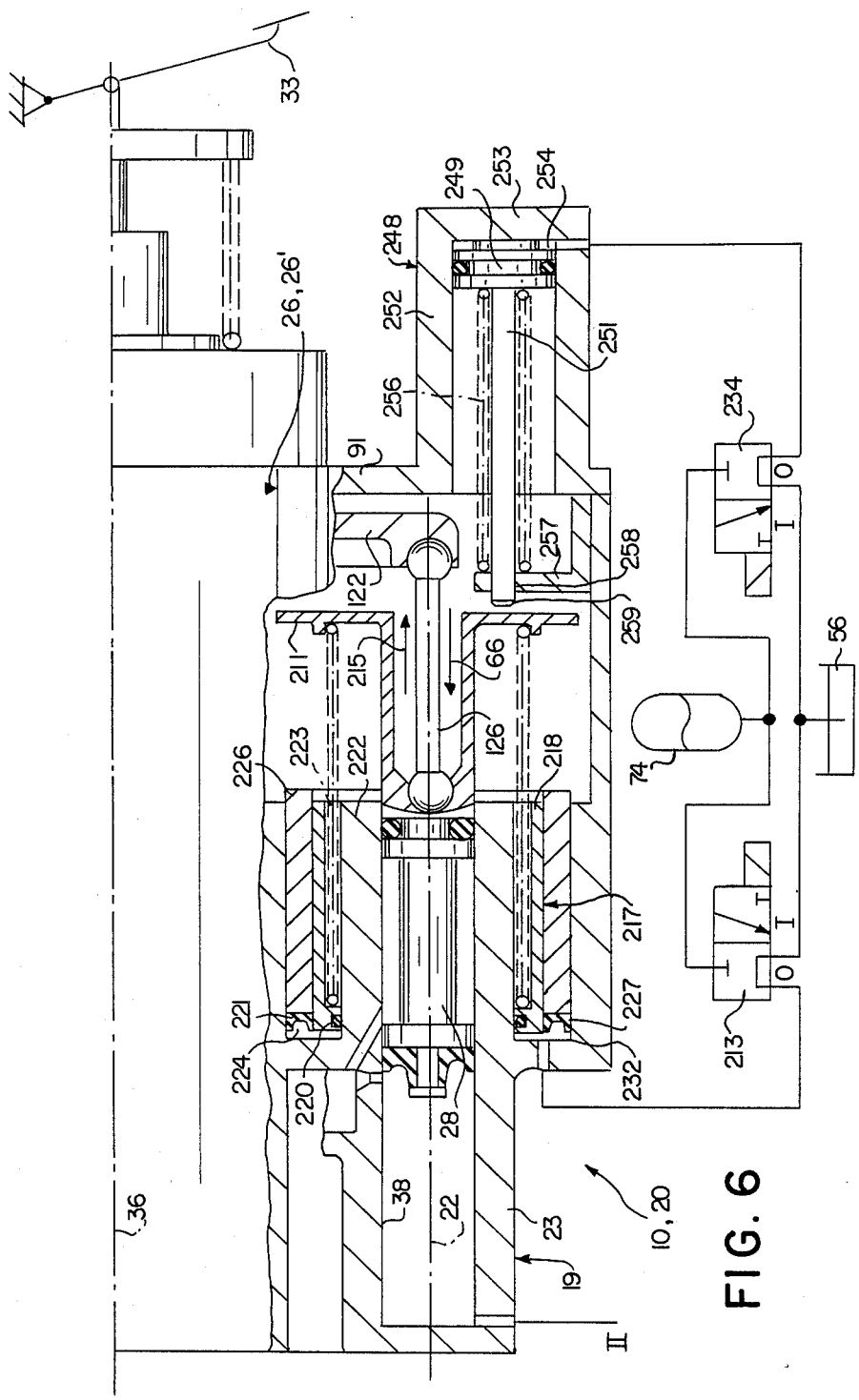
Figure 7:
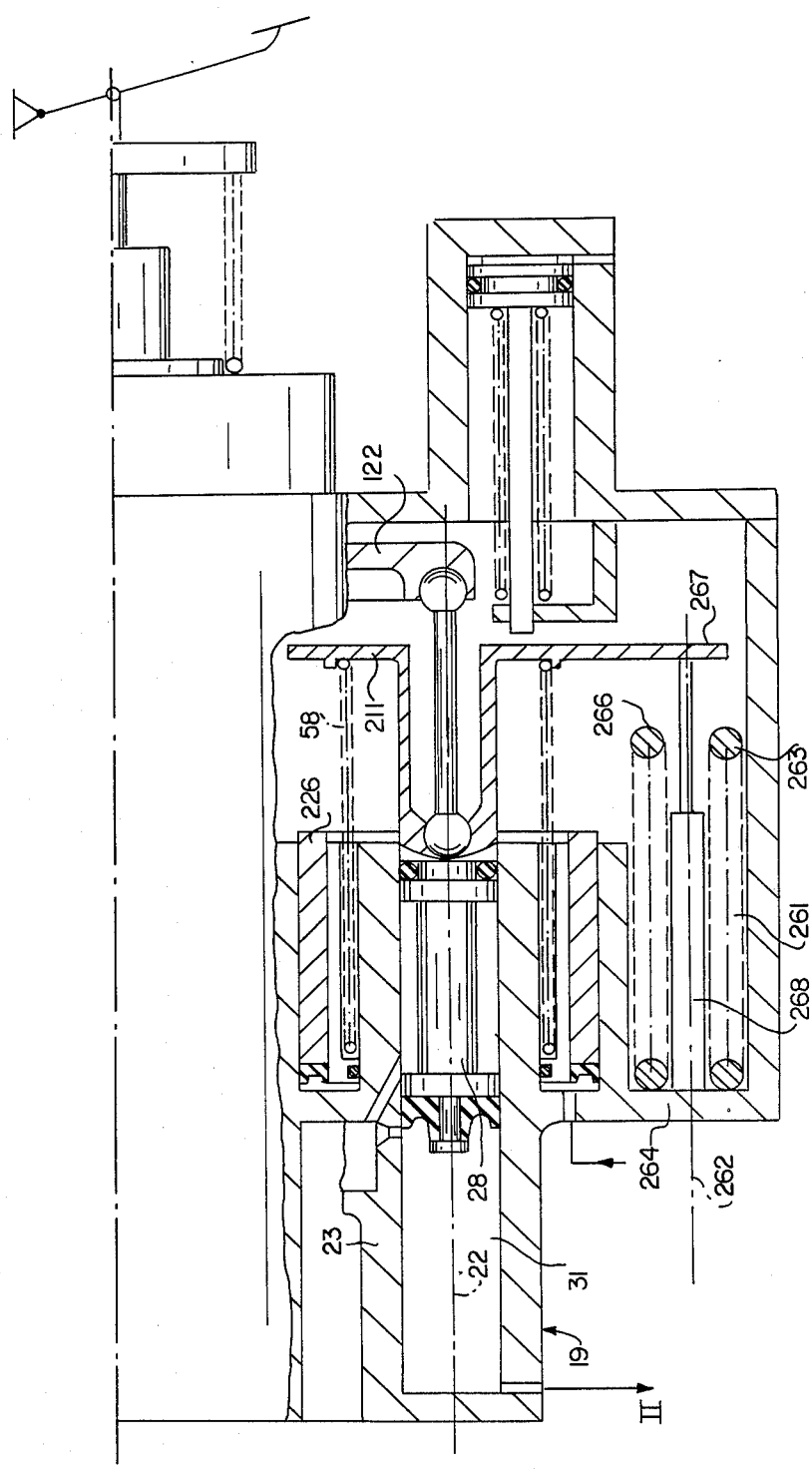
FIG. 7 is a cutaway view of a modification of the exemplary embodiment according to FIG. 6 with an additional spring for influencing the installed brake pressure distribution at high brake pressure.
Figure 8:
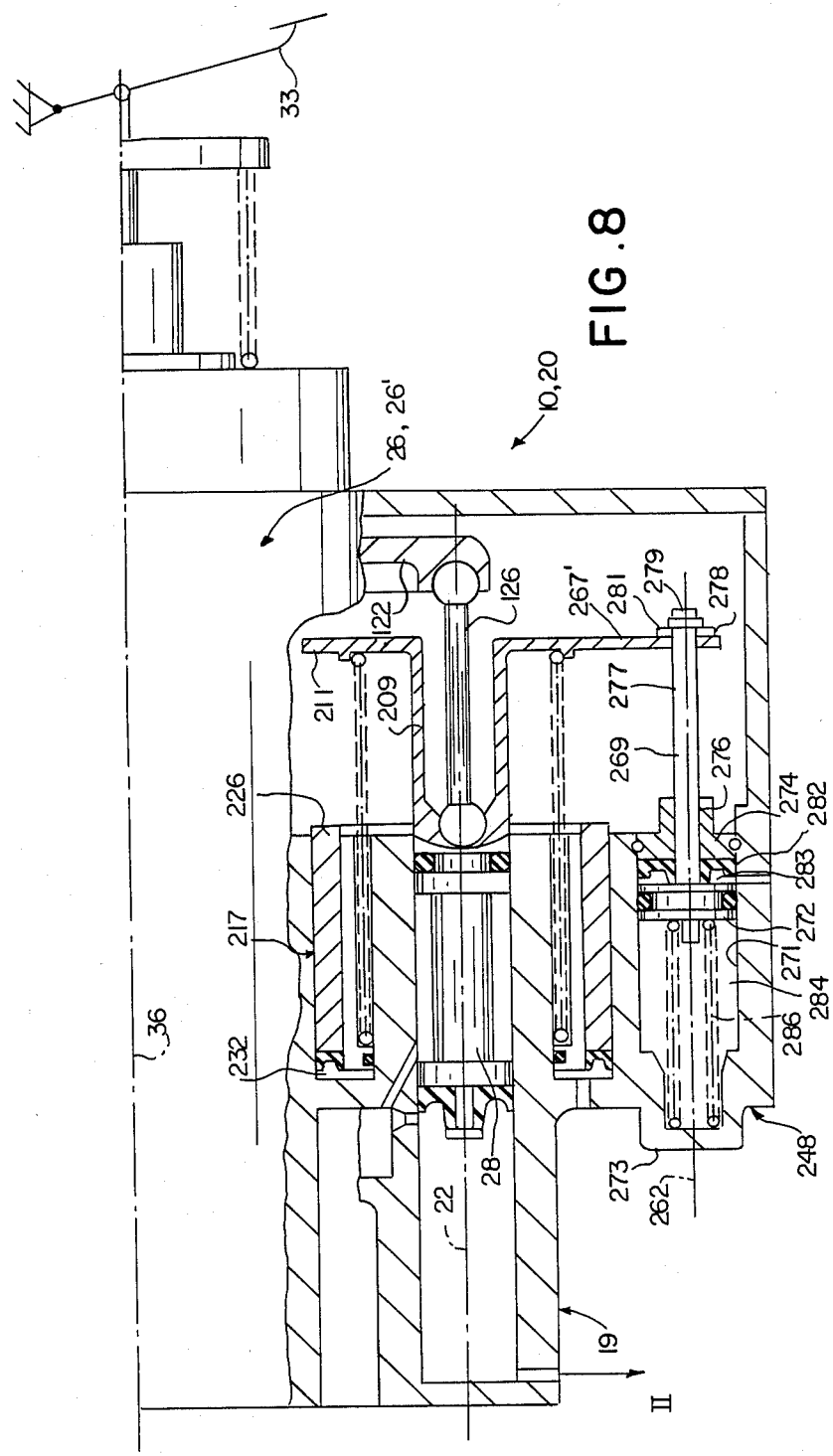
FIG. 8 is a cutaway view of a modification of the brake unit according to FIG. 6, in that the regulating cylinder for the propulsion control is arranged laterally relative to the master cylinder.

The special exemplary embodiments, illustrated in FIGS. 6 to 8, differ from the exemplary embodiment according to FIG. 4, in that they include regulating members for achieving a starting-slip control or propulsion control, but include a sleeve-shaped opposed piston 226 provided for achieving the antilock control function. of FIG. 4. To the extent indicated by the use of identical respective reference symbols, reference may be made to the description relating to FIG. 4 and the description of the exemplary embodiments according to FIGS. 6 to 8 can be restricted to their additional functional elements.

In the exemplary embodiment according to FIG. 6, the regulating cylinder provided for the starting-slip control function (ASC function) is a single-acting regulating cylinder 248. The piston 249 of cylinder 248 can be supported, via an elongate bar-shaped push rod 251, on the outside, facing the rocker 122, of the supporting flange 211 of the piston 28 of the master cylinder 19 assigned to the rear axle brake circuit II. The housing 252 of the ASC-regulating cylinder 248 is designed as a cylindrical pot-shaped rear widening of the housing cover 91 of the housing 23 of the brake unit 10 or 20 and is closed off on the outside by the end-face wall 253. In the basic position 0 of the ASC control valve 234, the drive pressure space 254, closed off movably by the piston 249 and fixedly relative to the housing in the axial direction by this end-face wall 253, is shut off from the auxiliary pressure source 74 and is connected to its tank or to the brake fluid storage tank 56 of the brake system. As long as this occurs, the piston 249 is urged, by a restoring spring 256 surrounding the push rod 251 coaxially and supported on a guide block 257 fixed to the housing, into the basic position shown, in which the piston 249 is supported on the end-face wall 253 via a short spacer piece. The push rod 251 passes through a guide bore 258 in the guide block 257 and, as seen in the illustrated basic position of the various functional elements, its free end 259 is located at a short distance of 1 to 2 mm from the supporting flange 211 of the piston 28 of the master cylinder 19.

In order to activate the ASC control, the control valve 234 is switched to its excited position I, wherein the drive pressure space 254 is connected to the auxiliary-pressure space 74 and is shut off from its tank or from the brake fluid storage tank 56. The displacement of the ASC-regulating piston 249 in the direction of the arrow 66 is transmitted to the master cylinder piston 28 via the push rod 251 which engages on the supporting flange 211 of the master cylinder piston 28 at a short radial distance from the central longitudinal axis 22 of the master cylinder 19. This results in the brake-pressure build-up necessary for ASC control taking place in the outlet pressure space 31 of the master cylinder 19.

As already described with reference to FIG. 5, the antilock control is activated by switching the ABS control valve 213 from its basic position 0 into the excited position I, in which the outlet pressure of the auxiliary pressure source 74 is fed into the working space 232.

The exemplary embodiment illustrated in FIG. 2 differs once again from that according to FIG. 6 only in additional cushioning and supporting elements, by which, from a specific minimum outlet pressure in the outlet pressure space 31 of the master cylinder 19, a variation in the brake pressure distribution to the front axle and to the rear axle is achieved with the effect of reducing the rear axle brake pressure fraction.

A description of the exemplary embodiment according to FIG. 7 is therefore restricted to these additional elements and otherwise reference is made to the description of FIG. 6, with the reference symbols used there being given.

In contrast to the representation of FIG. 7 chosen for the simplicity, the housing 23 is provided with two cylindrical pot-shaped widened portions 261, with their central longitudinal axes 262 extending parallel to the central longitudinal axis 22 of the master cylinder 19, and arranged symmetrically in relation to the central longitudinal axis 22 of the master cylinder 19, in such a way that their common plane is perpendicular to the drawing plane. Arranged in each of these lateral widened portions is an additional restoring spring 263 which, at one end, is fastened, in a way not shown in detail, to that end-wall portion 264 of the housing 23 which forms the bottom of the pot-shaped widened portion 261. The spring 263 is designed as a helical spring which is arranged axially relative to the longitudinal axis 262. The free end 266 of the spring 263 is located at a distance from the supporting flange 211 of the latter corresponding to between 30% and 60% of the maximum stroke which the piston 28 can execute between its basic position and its end position linked to a maximum outlet pressure of the master cylinder 19.

When the brake is actuated, the piston 28 of the master cylinder 19 is displaced until the supporting wings 267 of the supporting flange 211 run up against the spring ends 266 and the restoring springs 263 are thereby compressed. From this piston position onwards, the restoring force exerted on the piston 28 increases to a greater extent than if there were only the restoring spring 58. Because of this increase in the restoring force exerted on the piston 28 and the transmission of the hydraulically boosted actuating force to the master cylinder pistons 27 and 28 by the rocker 122 pivotable about the axis 123, as soon as a specific minimum pedal travel or a minimum pedal force is exceeded, there is a reduction of the rear axle brake pressure fraction in relation to the front axle brake pressure fraction. This is advantageous in terms of a stable driving and braking behavior of the vehicle, with good braking deceleration nevertheless being achieved at the same time.

The space remaining within the coils of the restoring spring 236 can be utilized to accommodate a displacement sensor 268 designed, for example, as a slide potentiometer, which comprises a resistance element connected firmly to the housing 23 and a pick-up element displaceable together with the supporting flange 211. The displacement sensor 268 generates an output signal which is characteristic of the distance of the master cylinder piston 28 from its basic position. The amplitude and time behavior of this output signal contains information which can be used for an appropriate control of antilock and/or ASC operations, for example for controlling the rebuild-up of pressure after a pressure reduction phase of the antilock control.

The exemplary embodiment according to FIG. 8 differs from that according to FIG. 6 only in the arrangement provided for the regulating cylinders 248 necessary for ASC control.

In contrast to the representation of FIG. 8, there are two regulating cylinders 248' which are arranged symmetrically relative to the central axis 22 of the master cylinder 19 assigned to the rear axle brake circuit II and of which the central axes 269 extending parallel to the central longitudinal axis 22 of the master cylinder 19 are in a plane perpendicular to the drawing plane and containing the central axis 22 of the master cylinder 19. The housing bores 171, within which the pistons 272 of the ASC-regulating cylinders 248' are guided displaceably in a pressure tight manner, are arranged laterally next to the annular groove 217 receiving the opposed pistons 226 for the antilock control and are closed off by a portion 273 of the housing end wall.

On the side facing the rocker 122 or the supporting flange 211 of the master cylinder piston 28, the housing bores 271 of the ASC-regulating cylinders 248' are each closed off by a guide bushing 274 inserted firmly into th respective bore. Passing through a central guide bore 276 in said bushing 274, is a slender piston 277 which is connected firmly to the piston 272 and which is connected fixedly in terms of tension to lateral supporting wings 267' of the supporting flange 211 of the master cylinder piston 28. The supporting wings 267' are each provided with an orifice 278 which is coaxial relative to the central longitudinal axis 269 of the particular regulating cylinder 248' and through which passes the free end portion 279 of the piston rod 277. A stop ring 281 is fixed to the piston rod on the outside of the respective supporting wing 267' of the supporting flange 211 and thereby ensures that the piston 272 of the regulating cylinder 248' is coupled fixedly, in terms of tension, to the piston 28 of the master cylinder 19.

In the exemplary embodiment illustrated, an annular gasket 282 is designed as a lip gasket and seals off the piston rod 277 of the piston 272 from the central bore 276 of the guide bushing 274 and from the housing bore 271 of the regulating cylinder 248'. The guide bushing 274 and annular gasket 282 form the limitation, fixed relative to the housing, of an annular drive pressure space 283 which is separated from the compensating space 284 of the regulating cylinder 248' by the piston 272.

Irrespective of actuation of the brake pedal 33, when the outlet pressure of the auxiliary pressure source 76 is fed into the drive pressure space 283 under solenoid valve control, the brake pressure build-up necessary for an ASC control phase is consequently possible in the outlet pressure space 31 of the master cylinder 19, the piston rods 277 acting as tension rods. During a braking operation, the pistons 272 of the regulating cylinders 248' remain in their basic position shown as a result of the effect of restoring springs 286. Inasmuch as reference symbols given in FIG. 8 are not mentioned in the part of the description belonging directly to FIG. 8, attention will therefore be drawn to the description of the parts of FIG. 6 which are designated as identical.

The exemplary embodiment of a brake unit 10 or 20 according to the invention illustrated in FIG. 9 is functionally equivalent to that according to FIG. 8. It differs from this from the point of view of construction, only in that instead of a single regulating cylinder surrounding the opposed piston 226, for the antilock control, and two single-acting regulating cylinders 248' for the ASC control, there are now two double-acting regulating cylinders 287 which are used both for antilock control and for propulsion or ASC control.

In contrast to the representation of FIG. 9, chosen for the sake of simplicity, the two regulating cylinders 287 are arranged in such a way that their central axes 262 extend in a plane which contains the central axis 22 of the master cylinder 19 and which is perpendicular to the drawing plane. As can be seen from the representation in FIG. 9a, this is a plane 288 which forms an angle of approximately 70° with the drawing plane 289 in the representation of FIG. 9a. Restoring springs 58 which urge the piston 28 of the master cylinder 19 into the basic position shown, corresponding to the non-actuated state of the brake system or brake unit 10 or 20, are supported between the housing 23 and the supporting flange 211 of the master cylinder piston 28. The restoring springs 58 are received, over some of their length, in blind bores 291 in the housing 23. The central longitudinal axes 292 of blind bores 291 extend at a lateral distance from the central longitudinal axes 262 of the double-acting regulating cylinders 287, in the arrangement illustrated in FIG. 9a and is symmetrical relative to the central longitudinal axis 22 of the master cylinder 19. The arrangement of the master cylinder 19 within the housing 23, of the regulating cylinders 287 and of the blind bores 291 for the restoring springs 58 results in a compact space-saving overall design, as seen in the cross-sectional representation of FIG. 9a.

In the same way as described with reference to FIG. 8, the piston 272', separating the working space 232' for the antilock control from the drive pressure space 283' for the ASC control within the bore 271' of the regulating cylinder 287, is connected to the supporting flange 211 of the piston 28 of the master cylinder 19 fixedly in terms of tension via an elongate piston rod 277'. The subjection of either one of the working spaces 232' and 283' to pressure for the activation of the antilock control or the ASC control respectively is controlled in the same way as explained with reference to FIGS. 5 and 6.

Where the antilock control is concerned, a driving-back force acting in the direction of the arrow 215 is exerted on the piston 28 of the master cylinder 19, as soon as the piston 272' of the regulating cylinder 287 runs with a stop shoulder 293 of its piston rod 277' up against the supporting flange 211 of the piston 28.

Possible relative movements between the piston 28 of the master cylinder 19 and the piston 272' of the regulating cylinder 287 are limited to a maximum stroke which corresponds to the distance existing between the stop shoulder 293 and the supporting flange 211 in the basic position shown.

In the illustrated basic position of the piston 272' of the regulating cylinder 287, the axial distance of the flange of the piston 272' separating the working spaces 232' and 283' relative to one another from the guide bushing 274 is also equal to this maximum stroke of the possible relative movements or somewhat greater than this.

The piston 272' is equipped with a central extension 294 in the form of a push rod, projecting into the working space 232' and surrounded coaxially by a helical spring 296 which urges a thrust ring 297, axially displaceable relative to the push rod 294, up against an end stop 298 of the push rod 294. During normal braking, the working or drive pressure spaces 232' and 283' of the regulating cylinder 287 are kept pressureless.

As soon as, in the event of a displacement in the pressure build-up direction 66 of the piston 28 supported by its supporting flange 211 on the stop shoulder 293 of the regulating-cylinder piston 272', the stop ring 297 comes up against a stop shoulder 299 of the bore 271' in the housing of the regulating cylinder 287, any further displacement of the composite piston structure 28, 272 also takes place counter to the now increasing restoring force of the spring 296. The effect is similar to the effect of the spring 163 of the brake unit 10 or 20 according to FIG. 7.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Brake unit for controlling the brake pressures in the wheel brakes of a road vehicle equipped with a hydraulic dual-circuit brake system via a hydraulic brake booster, said brake unit including:

two static master cylinders in a common unit housing with a brake-booster brake valve for supplying an outlet pressure proportional to the pedal force from an outlet pressure space to the wheel brakes, each of said master cylinders are assigned to one of the two brake circuits and each have a master piston, the master piston is displaceable in its outlet-pressure space to increase therein in response to an increased pressure caused by actuation of said brake booster valve, an actuating member displaceable as a result of pedal actuation and being supportable on the master piston, wherein in the event of a failure of an auxiliary pressure source of the brake booster, the master pistons are displaceable solely as a result of a control force exerted by the driver via said pedal actuation displacing the actuating member;

a brake booster including a drive piston and cylinder which can be subjected to a boost pressure in proportion to the outlet pressure of the brake valve and which brake booster piston effects the boosting of the actuating forces taking effect on the master pistons by transmitting to the drive cylinder the boost pressure and by having actuating forces generated by the drive cylinder connected to the master pistons through a rocker which jointly displaces both drive pistons and which is pivotable about an axis perpendicular to a longitudinal axis of the drive cylinder and which has rocker arms which engage the master pistons of the two master cylinders via supporting members in a torque-compensated manner to provide for the displacement thereof;

a compensating cylinder which is moved jointly with movement of the drive piston and which is subjected to the outlet pressure of the brake valve, a compensating piston of said compensating cylinder is displaceable relative to the drive piston and has a piston surface larger than a piston surface of the drive piston, and wherein the boost pressure at the drive is connected to the compensating cylinder to apply a force to the compensating piston in a same direction as the force resulting from the subjection of the drive cylinder to pressure by the brake booster valve and which is exerted on the drive piston, relative movements of the compensating piston in relation to the drive piston being limited by a stop connected fixedly to the drive piston, and wherein relative movements of the compensating piston in relation to the drive piston is limited to a distance, within which each master piston of the master cylinders are displaceable out of a basic position where the outlet-pressure spaces communicate with a brake fluid storage tank of the brake system, to another position where the outlet pressure spaces of the master cylinders are shut off relative to the brake fluid storage tank and any further displacement of the master pistons leads tank and any pressure build-up in the outlet pressure spaces connected to the wheel brakes.

2. Brake unit according to claim 1, wherein the drive cylinder is located in the housing between the master cylinders and is formed by a cylindrical pot-shaped part which projects from a housing cover that closes off the housing on the same side of the housing as the pedal;

a central housing bore is located between cylinder bores of the master cylinders and has a diameter larger than an outside diameter of the drive-cylinder housing;

the drive piston of the drive cylinder includes a hollow-tubular piston rod which passes displaceably in pressure tight manner through an end-face wall closing off an end of the drive cylinder at a side of the housing remote from the pedal, a flange being arranged outside this end-face wall on a free end portion of the piston rod, the flange being fixed relative to the piston and forms an end of a drive pressure space of the compensating cylinder, and wherein a movable portion of this compensating cylinder drive pressure space is formed by a bottom portions of a pot-shaped piston and a casing portion which is sealed off relative to an outer edge of the flange fixed to the piston rod;

supported on the bottom portion of the pot shaped piston is a bottom part of a pot-shaped sleeve and with a casing portion of the pot-shaped sleeve extending towards the housing cover in an annular gap located between inwardly facing walls of the master cylinders and an outer cylindrical surface of the drive housing;

the rocker is pivotal within the unit housing about the pot-shaped sleeve and is supported on the master pistons via push rods; and wherein the stop provided for limiting the relative movement of the piston of the compensating cylinder is a stop ring pointing radially inwards and arranged on the inner face of the casing portion of the pot-shaped piston.

3. Brake unit according to claim 1, wherein:

the drive cylinder is located in the housing between the master cylinders;

the drive piston of the drive cylinder includes a drive piston rod which projects from the housing of the brake unit on the same side as the pedal and on which a pedal tappet is supported;

a drive pressure space of the drive cylinder into which the outlet pressure of the brake valve can be fed, is partition wall, which is arranged on a side of the drive piston which forces the panel and which has a central bore, through the compensating cylinder is located side of the housing as the pedal is located and comprises a pot-shaped housing part connected to the drive piston rod and closed off on the same side of the housing as the pedal by a bottom portion fixed relative to the drive piston rod to define a piston of a drive pressure space of the compensating cylinder, a remaining portion of the drive pressure space of the compensating cylinder being defined by an axially movable end of the compensating piston, the rocker arms articulated to said compensating piston and pivotable about an axis extending perpendicularly to a longitudinal axis of the drive cylinder; and the stop limiting relative movement of the compensating piston being a radial stop flange which is located between the compensating piston and the partition wall which is fixedly connected to the drive piston rod at an axial distance from the partition wall that corresponds to a maximum displacement of the drive piston.

4. Brake unit according to claim 2, wherein:

the brake valve is a slide valve which is incorporated into the drive piston of the drive cylinder and which has a valve piston guided displaceably in a pressure-tight manner in a central bore of the drive piston and which is fixedly coupled to an actuating tappet of the brake pedal;

the drive piston and the valve piston, in the non-actuated state of the brake system, being urged by restoring spring means into a basic position, in which a non-pressurized compensating space is in communication with the drive pressure space of the drive cylinder and a drive pressure space of the compensating cylinder and wherein the outlet pressure of the brake valve is shut off from these two drive spaces, and, wherein when the brake pedal is actuated counter to a restoring force of the restoring spring means, the drive piston is displaced to a position in which the compensating space in communication with the drive pressure spaces is shut off and these spaces are then subsequently connected to the pressure outlet of the brake valve;

the communication is provided by a small compensating channel connecting the compensating space to an inner longitudinal channel of the brake valve which is connected to the two drive spaces through an orifice and which longitudinal channel is alternatively connected to a source of auxiliary pressure by an inlet-pressure space of the valve piston which is in constant communication with the auxiliary pressure source when an annular groove connected to the longitudinal channel in the brake valve comes into communication with said inlet pressure space.

5. Brake unit according to claim 4, wherein:

the brake valve is an elongate pot-shaped sleeve;

the piston of the drive cylinder has a continuous axial bore widening in three steps between the compensating space and the drive pressure space, each step having a different sized diameter, the step of least diameter also passing through a piston extension which projects into the compensating space and which has an outer diameter which is less than an outer diameter of the drive piston;

the brake valve is guided displaceably in the smallest bore step and has a sleeve bottom which seals off the bore step of the piston of the drive means relative to the compensating space;

the pot-shaped sleeve is provided, in a region near a sleeve bottom, with a transverse bore which connects the small compensating channel to the inner longitudinal channel and wherein the transverse bore has an outer edge facing the pedal, in the basic position of the bake valve and which is arranged within the cross-section of the compensating channel on the piston extension of the drive piston;

the brake valve is provided, within the middle bore step of intermediate diameter, with a transverse channel forming the pressure outlet of the brake valve and the connections to the two drive spaces;

the brake valve is provided, between this transverse channel and the transverse bore, with the annular groove which communicates via a further transverse bore with the longitudinal channel of the brake valve and wherein an outer flank of the groove closest to the compensating space in the basic position of the brake valve, is arranged at an axial distance from an inner edge of the transverse channel of the brake valve for connecting the inlet pressure space to one of the bore steps of the drive piston, the same axial distance being at least and approximately equal to the distance between an inner edge of the transverse channel of the brake valve and an outer edge of the transverse bore of the pot-shaped sleeve;

within the bore step of the drive piston of largest diameter, a piston rod is fixedly connected to the drive piston in a pressure-tight manner; and wherein an axial piston is guided displaceably in a pressure-tight manner in the end portion of the piston rod located on the same side as the pedal and which is fixedly connected to the brake pedal and which is fixedly connected to the valve piston by an elongated bar-shaped push rod, the interior of the piston rod being in communication with the middle bore step of the drive piston and consequently also with the pressure outlet of the brake valve via an annular gap and in communication with the drive pressure space of the drive cylinder via a transverse bore.

6. Brake unit according to claim 1, wherein:

the brake valve is a slide valve which is incorporated into the drive piston of the drive cylinder, is guided displaceably in a pressure-tight manner in a central bore of the drive piston and is fixedly coupled to an actuating tappet of the brake pedal;

the drive piston and the brake valve, in the non-actuated state of the brake system, being urged by restoring spring means into a basic position, in which non-pressurized compensating space is connected in communication with the drive pressure space and wherein a drive pressure space of the brake valve and the pressure outlet of the brake valve is shut off from these two drive spaces; and, when the brake pedal is actuated counter to the restoring force of the restoring spring means, the drive piston assumes a position in which the compensating space is shut off relative to the two drive pressure spaces and these are subsequently connected the pressure outlet of the brake valve when it has moved across a small compensating channel which connects the compensating space to an inner longitudinal channel in the brake valve, and wherein an outer annular groove in the brake valve and connected to the longitudinal channel has at the same time entered into fluid communication with a transverse channel which is connected to an inlet-pressure space of the valve piston which is in constant communication with an auxiliary pressure source.

7. Brake unit according to claim 6, wherein:

a piston rod connects the drive piston of the drive cylinder to the compensating cylinder and is formed as a hollow tube which connects to a valve bore in the drive piston and which, in the immediate vicinity of an end of the drive piston is provided with the compensating channel communicating the compensating space with the longitudinal channel of the brake valve via the interior of the piston rod; the brake valve is a small tube which passes through the central bore of the drive piston, is connected to an actuating piston adjacent the pedal, is closed off by the said actuating piston and is urged by a restoring spring supported between a side of the piston defining the drive pressure space and a stop piece fixedly connected to the actuating piston within the drive pressure space, into the basic position in which the compensating space is connected to the drive pressure spaces and, as a result of a displacement of the actuating piston in the pressure build-up direction, can be brought into a position in which the compensating channel is closed by the end of the valve piston and wherein the longitudinal channel of the brake valve is connected to the inlet-pressure space of the valve piston via the annular groove and transverse channel connecting.

8. Brake unit according to claim 7, wherein a housing end piece is guided screwably into an end portion of the housing, located on the same side as the pedal and can be fixed in a specific position relative to the housing.

9. Brake unit according to claim 1, wherein displacement of the compensating piston of the compensating cylinder relative to the drive piston of the drive cylinder takes place counter to the restoring force of a restoring spring which has a progressive spring characteristic.

* * * * *